United States Patent
Budd et al.

(10) Patent No.: US 10,701,908 B2
(45) Date of Patent: Jul. 7, 2020

(54) INDOOR SHRIMP AQUACULTURE SYSTEM AND METHOD

(71) Applicants: Marvyn Budd, Toronto (CA); Miodrag Andric, North Vancouver (CA); Daniel Stechey, Cobourg (CA); Douglas Ernst, Carlsbad, CA (US)

(72) Inventors: Marvyn Budd, Toronto (CA); Miodrag Andric, North Vancouver (CA); Daniel Stechey, Cobourg (CA); Douglas Ernst, Carlsbad, CA (US)

(73) Assignee: Planet Shrimp Inc., Ontario (CA)

( * ) Notice: Subject to any disclaimer, the term of this patent is extended or adjusted under 35 U.S.C. 154(b) by 220 days.

(21) Appl. No.: 15/527,951

(22) PCT Filed: Nov. 19, 2015

(86) PCT No.: PCT/CA2015/051209
§ 371 (c)(1),
(2) Date: May 18, 2017

(87) PCT Pub. No.: WO2016/077928
PCT Pub. Date: May 26, 2016

(65) Prior Publication Data
US 2017/0354128 A1    Dec. 14, 2017

Related U.S. Application Data

(60) Provisional application No. 62/081,924, filed on Nov. 19, 2014.

(51) Int. Cl.
*A01K 61/59* (2017.01)
*A01K 61/90* (2017.01)
(Continued)

(52) U.S. Cl.
CPC .............. *A01K 61/59* (2017.01); *A01K 61/90* (2017.01); *A01K 63/006* (2013.01); *A01K 63/045* (2013.01); *Y02A 40/824* (2018.01)

(58) Field of Classification Search
CPC ........ A01K 61/59; A01K 61/90; A01K 61/50; A01K 63/006; A01K 63/045; Y02A 40/824
See application file for complete search history.

(56) References Cited

U.S. PATENT DOCUMENTS

| | | | |
|---|---|---|---|
| 3,658,034 A | 4/1972 | Day et al. | |
| 3,724,423 A * | 4/1973 | Day | A01K 61/59 119/209 |

(Continued)

FOREIGN PATENT DOCUMENTS

WO    2014183765    11/2014

OTHER PUBLICATIONS

Budd, et al., International Preliminary Report dated May 23, 2017 for international application PCT/CA2015/051209.

(Continued)

*Primary Examiner* — Joshua D Huson
(74) *Attorney, Agent, or Firm* — STOEL RIVES LLP

(57) ABSTRACT

A system for indoor shrimp aquaculture is described that comprises a plurality of stacked raceways, each raceway being a long, flat rectangular tank comprising at least two sections arranged in series and scaled to accommodate shrimp of increasing size. The sections are separated by a moveable section divider whereby shrimp may be transferred between sections once they reach a predetermined size by opening the moveable section divider and allowing the shrimp and water to flow through into the next section. Each raceway includes a waste collection assembly situated at the downstream end of each section for collecting waste (Continued)

for removal. Methods of using the system to grow shrimp are also provided. The raceways are further adapted to facilitate operation of the production module at large scales, in this way; the system is scaleable to achieve high-throughput production of shrimp.

19 Claims, 13 Drawing Sheets

(51) Int. Cl.
*A01K 63/00* (2017.01)
*A01K 63/04* (2006.01)

(56) References Cited

U.S. PATENT DOCUMENTS

| | | | | |
|---|---|---|---|---|
| 4,003,337 | A * | 1/1977 | Moore | A01K 63/00 |
| | | | | 119/224 |
| 4,221,187 | A * | 9/1980 | Casey | A01K 63/10 |
| | | | | 119/232 |
| 4,285,298 | A | 8/1981 | Dugan et al. | |
| 4,324,200 | A * | 4/1982 | Johnson | A01K 67/033 |
| | | | | 119/200 |
| 8,336,498 | B2 * | 12/2012 | Lawrence | A01K 61/59 |
| | | | | 119/211 |
| 2001/0045189 | A1 | 11/2001 | McNeil | |
| 2004/0107914 | A1 * | 6/2004 | Untermeyer | A01K 63/04 |
| | | | | 119/215 |
| 2005/0034676 | A1 * | 2/2005 | Taylor | A01K 61/60 |
| | | | | 119/219 |
| 2005/0120970 | A1 * | 6/2005 | Massingill | A01K 63/04 |
| | | | | 119/216 |
| 2010/0294202 | A1 | 11/2010 | Lawrence | |

OTHER PUBLICATIONS

Budd, et al., International Search Report and Written Opinion dated May 26, 2016 for international application PCT/CA2015/051209.

* cited by examiner

INDOOR SHRIMP AQUACULTURE SYSTEM AND METHOD

RELATED APPLICATIONS

This application is a U.S. National Stage Application of International Application No. PCT/CA2015/051209, filed Nov. 19, 2015, which claims the benefit of U.S. Provisional Application No. 62/081,924, filed Nov. 19, 2014, all of which are incorporated herein by reference.

FIELD OF THE INVENTION

The present invention relates to the field of aquaculture and, in particular, to methods and systems for growing shrimp indoors.

BACKGROUND OF THE INVENTION

Shrimp farming from the world's oceans can no longer safely meet demand. Alternative methods to try to meet the demand have been developed and enhanced. Typically shrimp production comes from outdoor ponds operated throughout the world but predominantly in tropical or warm climates such as Asia and South America. The outdoor farming methods, while productive, face challenges and drawbacks with respect to disease contraction, environmental damage and a continuing need for various chemicals to keep the shrimp alive and enhance growth.

Farming methods have been developed for indoor closed containment providing a controlled and sometimes enhanced shrimp production. While these methods offer some improvements over outdoor farming, there are still drawbacks associated with the methods. For example, many indoor commercial farms still require large spaces and substantial amounts of water while few practice a high level of bio-security.

U.S. Pat. No. 4,285,298 describes a method and apparatus for intensive rearing of post-larvae shrimp under controlled conditions. The apparatus comprises first and second rearing units containing habitat structures formed from a plurality of stacked substrates, in which the combined total surface area of the second rearing unit is greater than that of the first rearing unit. Shrimp are moved from the first rearing unit to the second rearing unit after a pre-determined period of growth.

U.S. Pat. No. 8,336,498 describes a system and method for super-intensive shrimp production. The system includes a set of at least two raceways having sloped bottoms with either a bottom nadir or apex, with one of the raceways being at least partially stacked on top of the other. Raceways may be different sizes and shrimp may be transferred from raceway to raceway as they increase in size.

U.S. Patent Application Publication No. 2001/0045189 describes a shrimp culture system that comprises one or more horizontal sheet-like dividers that are used to subdivide a water tank into multiple flow zones. Strips or fronds of high surface area material are attached to the dividers to promote the photosynthetic production of oxygen in the flow zones.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention relates generally to an indoor shrimp aquaculture system and method. In accordance with one aspect, the invention relates to a raceway for shrimp aquaculture comprising:

a plurality of interconnected sections arranged in series from an upstream receiving end of the raceway to a downstream harvesting end of the raceway, said sections having substantially the same width, but each section having a greater length than the preceding section;

a moveable section divider separating each section of said raceway from the preceding section, said moveable section divider being moveable between a closed position wherein water and shrimp are separately contained in each section separated by the moveable section divider, and an open position wherein water and shrimp may pass between said sections from an upstream to downstream direction;

a waste collection assembly situated at the downstream end of each section, said waste collection assembly configured for collecting waste in said section for removal; and a fixed end wall at each of the receiving end and the harvesting end of the raceway.

In accordance with another aspect, the invention relates to a raceway for shrimp aquaculture comprising:

a plurality of interconnected sections arranged in series from an upstream receiving end of the raceway to a downstream harvesting end of the raceway, said sections having substantially the same width, but each section having a greater length than the preceding section;

a weir assembly situated between adjacent sections of said raceway, said weir assembly comprising a fixed portion and a moveable portion, said moveable portion being moveable between a closed position wherein water and shrimp are separately contained in each section separated by the weir assembly, and an open position wherein water and shrimp may pass between said adjacent sections from an upstream to downstream direction;

a reservoir attached to the fixed portion of said weir assembly and fluidly connected to said upstream section such that water overflow from said upstream section spills over the top of said reservoir for collection therein; and a fixed end wall at each of the receiving end and the harvesting end of the raceway.

In accordance with another aspect, the invention relates to a raceway for shrimp aquaculture comprising:

a plurality of interconnected sections arranged in series from an upstream receiving end of the raceway to a downstream harvesting end of the raceway, said sections having substantially the same width, but each section having a greater length than the preceding section;

a pair of connecting end caps situated between adjacent sections of said raceway and operably connected together to support a moveable section divider separating said adjacent sections, wherein said moveable section divider is moveable between a closed position wherein water and shrimp are separately contained in each section separated by the moveable section divider, and an open position wherein water and shrimp may pass between said sections from an upstream to downstream direction;

a waste collection assembly situated within at least one of said pair of end caps, said waste collection assembly configured for collecting waste in said section for removal; and a fixed end wall at each of the receiving end and the harvesting end of the raceway.

In accordance with another aspect, the invention relates to a system for shrimp aquaculture comprising a plurality of raceways as described herein, a support structure and a water recirculation system for maintaining water quality, the plurality of raceways stacked one above the other on the support structure.

In accordance with another aspect, the invention relates to a method of shrimp aquaculture comprising:

providing at least one raceway as described herein, wherein the raceway comprises at least first, second and third interconnected sections, the first section at the upstream receiving end of the raceway;

introducing larval, post-larval, or juvenile shrimp into the first section;

growing the shrimp to a first pre-determined size;

transferring the shrimp of the first pre-determined size to the second section of the raceway, the second section being adjacent to the first section, by moving the moveable section divider separating the first and second sections from the closed position to the open position and allowing the shrimp to move into the second section;

growing the shrimp to a second pre-determined size;

transferring the shrimp of the second pre-determined size to the third section of the raceway, the third section being adjacent to the second section, by moving the moveable section divider separating the second and third sections from the closed position to the open position and allowing the shrimp to move into the third section; and growing the shrimp to a third pre-determined size.

In certain embodiments, the method further comprises harvesting the shrimp of pre-determined size from the harvesting end of the raceway.

BRIEF DESCRIPTION OF THE DRAWINGS

These and other features of the invention will become more apparent in the following detailed description in which reference is made to the appended drawings.

DETAILED DESCRIPTION OF THE INVENTION

Figure 1:
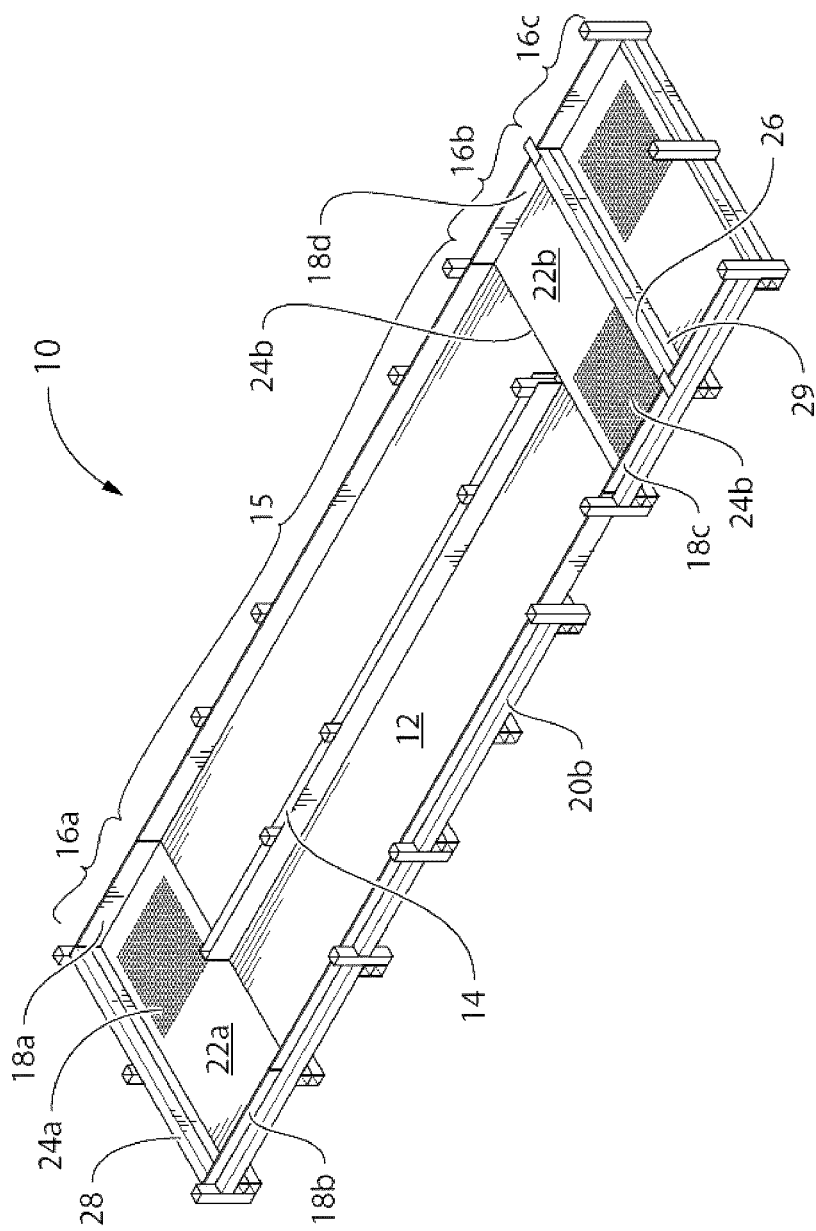
FIG. 1 is a perspective view of a section of a raceway in one embodiment.

An integrated and flexible system and method for the indoor farming of shrimp is disclosed herein. The system employs shallow water compared to conventional indoor farms using pond technology that requires 0.6-3.5 meters of water depth. The disclosed system thus reduces the weight requirement, allowing for the stacking of raceways and increasing production per square foot of floor space. The system is readily implemented inland and thus can allow for the production of fresh and/or live shrimp in close proximity to the local marketplace and delivery to the point of sale within hours of being harvested. The system is intended primarily for the farming of the Litopenaeus vannamei species of shrimp (Pacific white shrimp), but its use to farm other species of shrimp is contemplated in certain embodiments.

The system comprises a plurality of production modules, each of which comprises a plurality of stacked raceways. Each raceway in a production module comprises two or more sections scaled to accommodate shrimp of increasing size and separated by a moveable, or partially moveable, section divider. The raceways are modular and allow for a number of raceways to be combined in a variety of combinations to form a production module that meets the particular requirements for production in a given system. According to embodiments of the present disclosure, the raceways are further adapted to facilitate operation of the production module at large scales. For example, in certain embodiments, the raceways are equipped to facilitate cleaning and waste removal, energy conservation, animal transfer between grow stages, and/or acclimation between nursery and grow-out areas, in systems of large scale production. In this way, the system is scaleable to achieve high-throughput production of shrimp.

In certain embodiments, the system is a closed or zero water exchange system in which water is reused over a given period of time. This time may be relatively short, for example, 6 months or less, or it may be relatively long, for example, between about 6 months and 3 years. When the system is a closed or zero water exchange system, a portion of the water in the raceways that is transferred between sections together with the shrimp, is collected when the shrimp are harvested and treated as needed, for example, for salinity, temperature and/or chemical balance, or according to certain embodiments routed through a recirculating aquaculture system (RAS) a variety of which are known in the art. The water may then be re-introduced into the raceway(s).

In a closed or zero water exchange system, it is expected that a small amount of water, for example between about 0.5% and 2.5% will be lost per day due to condensation and/or spillage. Accordingly, the system may require a top up either periodically or on a regular basis. Thus in certain embodiments, a small percentage of new water may be introduced into the system periodically or on a regular basis as needed.

In certain embodiments, waste is removed from the system regularly, for example on a daily basis, through waste collection assemblies at various locations in the raceways. This waste water may be treated so as to separate unwanted matter and then optionally re-used, for example, by re-introduction into the system as part of the water source or as a product for use in other systems such as in hydroponics or poultry feed. Alternatively, the waste water may be discharged into the sewer system. In certain embodiments, the system is configured to ensure minimal discharge of waste water into the sewer system. When waste water is discharged, the water may first be treated to reduce toxins or other undesirable content.

In certain embodiments, the system utilizes Biofloc to reduce the requirement for waste removal. Biofloc systems are more eco-friendly than utilizing a bio-filter. Biofloc is a natural bacterial-based mixture that will remain as part of the water chemistry and acts as a natural filter with an added bonus of adding nutrients to the water, reducing the feed requirement of the animals. No energy is required for a Biofloc system as compared to using a bio-filter as part of a water recirculating system. The system can be successfully implemented using either a bio-filtration system or a Biofloc system and thus in certain embodiments, the system may utilise a bio-filter for cleaning re-circulated water.

Typically, the shrimp are introduced into the raceways as juvenile animals between about 6 weeks and about 12 weeks old, although the use of younger post-larval animals, for example, between about 7 days and 3 weeks old, or younger juvenile animals between about 3 weeks and 6 weeks old, is contemplated in certain embodiments. When 6 to 12-week old juvenile shrimp are used, these may be obtained from an external source, or the system may optionally comprise a separate nursery to grow post-larval shrimp to a suitable point for transfer into the production modules.

According to certain embodiments, the production modules of the instant disclosure can be adapted to allow for seamless sequential production of shrimp through the life cycle of the shrimp. Each raceway of a production module comprises a plurality of divided sections wherein shrimp are transferred at each grow stage by simply allowing the shrimp to pass through each section thereby avoiding the need to handle the shrimp between each grow stage and minimizing the risk to shrimp health. In some embodiments, the production module can include an initial nursery section that is adjacent to the grow stage sections of the same raceway. In this way, the production module can be adapted to be a fully self-contained system for growing shrimp from the initial nauplii or larval stages through to post-larval stages and harvest.

Definitions

Unless defined otherwise, all technical and scientific terms used herein have the same meaning as commonly understood by one of ordinary skill in the art to which this invention belongs.

As used herein, the term "about" refers to an approximately +/−10% variation from a given value. It is to be understood that such a variation is always included in any given value provided herein, whether or not it is specifically referred to.

The term "plurality" as used herein means more than one, for example, two or more, three or more, four or more, and the like.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, use or method, denotes that additional elements and/or method steps may be present, but that these additions do not materially affect the manner in which the recited composition, method or use functions. The term "consisting of" when used herein in connection with a composition, use or method, excludes the presence of additional elements and/or method steps. A composition, use or method described herein as comprising certain elements and/or steps may also, in certain embodiments consist essentially of those elements and/or steps, and in other embodiments consist of those elements and/or steps, whether or not these embodiments are specifically referred to.

It is contemplated that any system embodiment discussed herein can be implemented with respect to any disclosed method, and vice versa.

Raceways

The raceways incorporated into the indoor shrimp aquaculture system disclosed herein are generally long horizontal flat tanks comprising two or more sections of pre-determined size arranged in series, with sections being separated from each other by a movable section divider. While a raceway may have as few as two sections, more typically, a raceway will comprise 3 or more sections, for example, between 3 and 6 sections. In certain embodiments, a raceway may contain between 3 and 4 sections.

Figure 4:
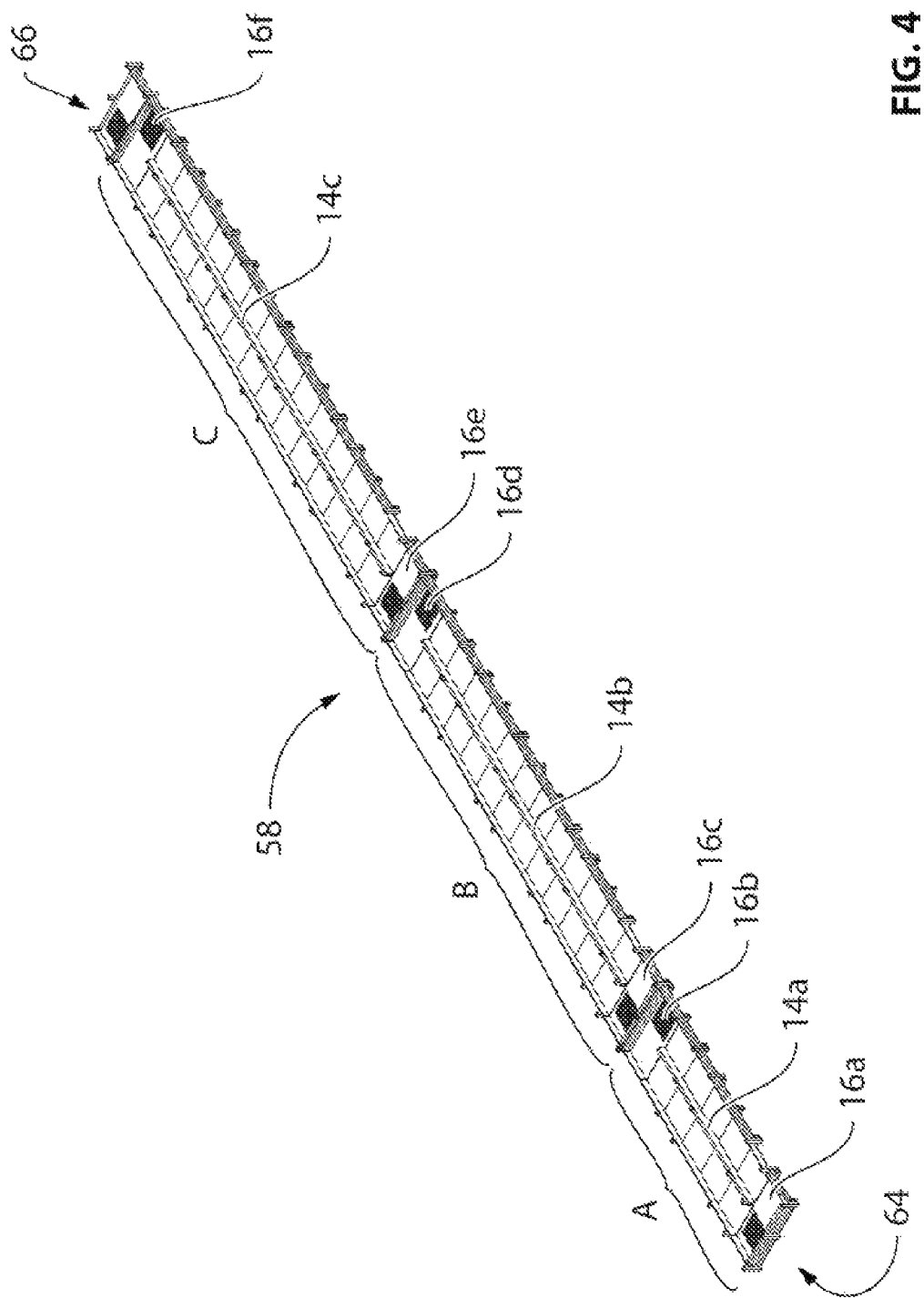
FIG. 4 is a perspective view of a raceway in one embodiment.

The sections range in size (as a percentage of the overall length of the raceway) and are scaled to accommodate increasingly larger sizes of shrimp. Thus, each section in the series is progressively larger than its preceding section and shrimp are moved from smaller to larger sections as they grow. FIG. 4 illustrates an embodiment of a typical raceway 58 of the present disclosure that comprises three sections (A, B, C). The sections serially extend from an upstream receiving end 64 to a downstream harvesting end 66 and progressively increase in size from upstream to downstream of the raceway 58. The initial section (A) is the smallest section and forms the receiving end 64 of the raceway 58. Section (C) is the largest section and forms the harvesting end 66 of the raceway 58.

Raceways can vary in length and width, with the overall size being determined by the size of the building in which the system is housed. Typically, however, raceways have a substantially greater length than width. In general, longer raceways result in greater production, however, the overall length of a raceway will generally be determined by the physical building floor plan. The width of each raceway will also vary depending on the building floor plan, but typically will not exceed 5 meters. Typical dimensions for raceways are between about 3 meters and about 5 meters in width. According to certain embodiments, the raceway has a width of about 4.5 meters. The length of each raceway will also vary depending on the building floor plan, but typically will be between about 50 meters and about 150 meters in length. According to certain embodiments, the raceway has a length of about 97 meters. These dimensions are exemplary only. Other dimensions are also possible depending on the dimensions of the building in which the system is to be housed. Production is affected by square footage/meters of the largest section in the raceway, with greater square footage generally leading to higher production, so raceways will be designed accordingly.

In certain embodiments, the sections may range in size from about 1% to about 55% of the overall length of the raceway. By way of example, in a raceway comprising 4 sections, the size of each section as a percentage of the overall length of the raceway may be (from smallest (i) to largest (iv)): (i) 1.0% to 15%, (ii) 8% to 25%, (iii) 15% to 35% and (iv) 25% to 45%. An exemplary embodiment of a 4 section raceway may have the following sized sections: (i) 9.5%, (ii) 20.5%, (iii) 30% and (iv) 40%. Another exemplary embodiment of a 4 section raceway with an overall length of about 97.5 m may have the following sized sections: (i) 13%, ii) 22%, iii) 29% and iv) 36%. In a raceway with 4 sections as described above, a moveable section divider would be present at the end of each of sections i, ii and iii to allow for the transfer of the animals at specific stages in their growth cycle.

FIG. 1, provides an example of a section of a raceway in accordance with one embodiment. The section 10 extends from an entrance end 28 to a transfer end 29 and comprises a flat bottom 12. The section comprises a rectangular main body 15 that, according to the embodiment shown, extends between two end caps 16a, 16b. The entrance end of the following section 30 comprising end cap 16c is also shown in FIG. 1.

The side walls 20a, 20b of the section are either oriented substantially at 90 degrees to the bottom 12 or are slightly rounded in shape. The height of the side walls 20a, 20b can range from about 20 cm to about 100 cm, for example, from about 20 cm to about 90 cm, from about 25 cm to about 90 cm, from about 30 cm to about 80 cm, or from about 30 cm to about 70 cm. The water depth in the section 10 will typically be kept sufficiently below the height of the side walls 20a, 20b to avoid overflow and minimise spillage, for example, the water level may be about 5 cm to about 50 cm, for example, about 10 cm to about 50 cm or about 10 cm to about 20 cm, lower than the side wall height.

Side walls 20a, 20b typically have a thickness between about 0.25 cm to about 7.50 cm, for example, between about 0.25 cm, 0.35 cm or 0.45 cm and about 6.50 cm, 5.50 cm, 4.50 cm, 3.50 cm or 2.50 cm. In some embodiments, side walls 20a, 20b have a thickness between about 0.45 cm and about 1.30 cm.

No-Touch Transfer of Shrimp—Moveable Section Divider

The sections in each raceway are defined by a moveable section divider. The moveable section divider in effect forms a separating wall between each section to separate each section of said raceway from the preceding section. The moveable section divider is moveable between a closed position and an open position. In the closed position, the section divider creates a closed section wherein water and shrimp at differing growth stages are separately contained in the defined section to allow the shrimp to grow to the predetermined size. Once the shrimp have attained the desired growth size, the moveable section divider is moved to the open position wherein water and shrimp may pass to the next section in the series. In this way, shrimp can be transferred at each grow stage by simply allowing the shrimp to pass through each section on their own, through the flow of water and optionally a crowding technique, without the need to handle the shrimp, or remove the shrimp from the water, between each grow stage. Risk to shrimp health, stress caused to the shrimp, introduction of disease, and damage to the shrimp product can therefore be minimized.

According to certain embodiments of the present disclosure as shown in FIG. 1, each section of a raceway may be adapted to comprise end caps 16a, 16b, 16c. The End Caps have side walls 18a, 18b, 18c, 18d that are contiguous with the two side walls 20a, 20b of the main body 15. While the end cap side walls 18a, 18b, 18c, 18d are typically the same height and thickness as the section side walls 20a, 20b, certain embodiments contemplate that the dimensions of the end cap side walls 18a, 18b, 18c, 18d may slightly differ from the side walls 20a, 20b of the main body 15.

Figure 2A:
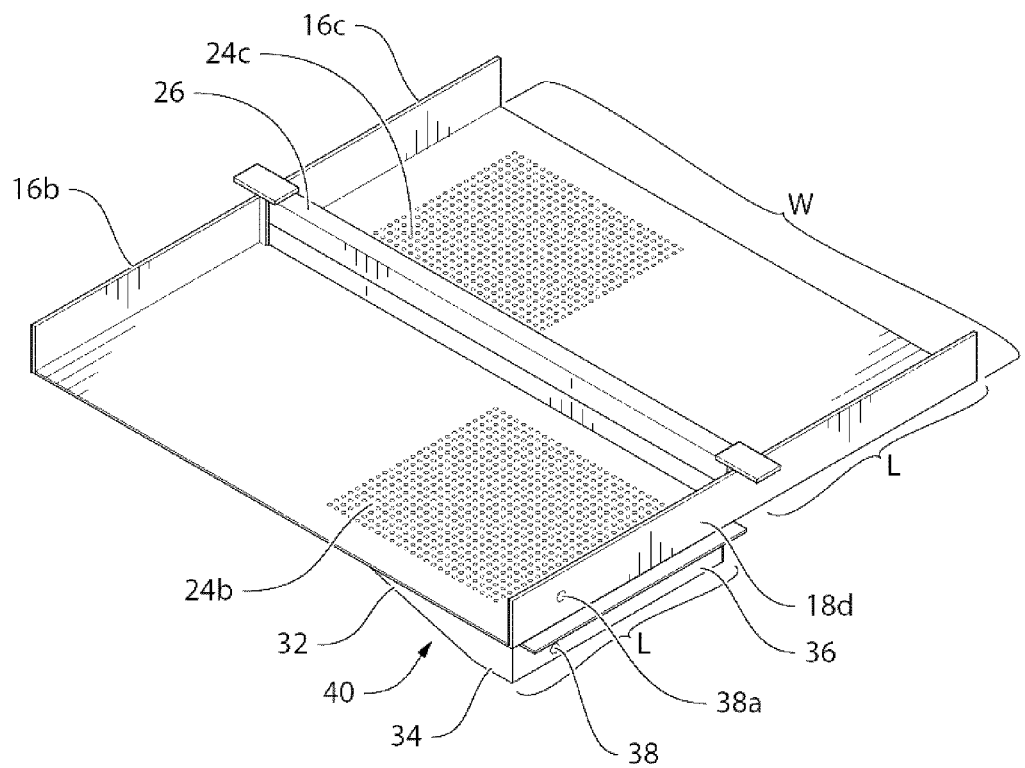
FIG. 2A is a perspective view of a pair of end caps in one embodiment with the moveable section divider in the closed position.
Figure 2B:
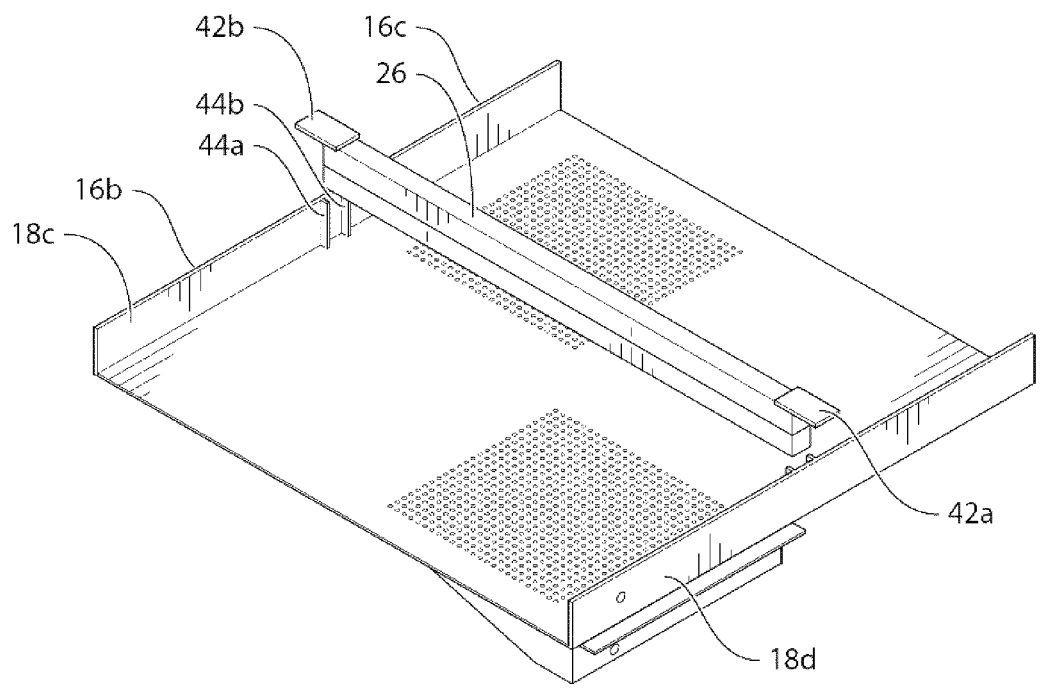
FIG. 2B is a perspective view of the pair of end caps shown in FIG. 2A, with the moveable section divider in the open position.
Figure 3A:
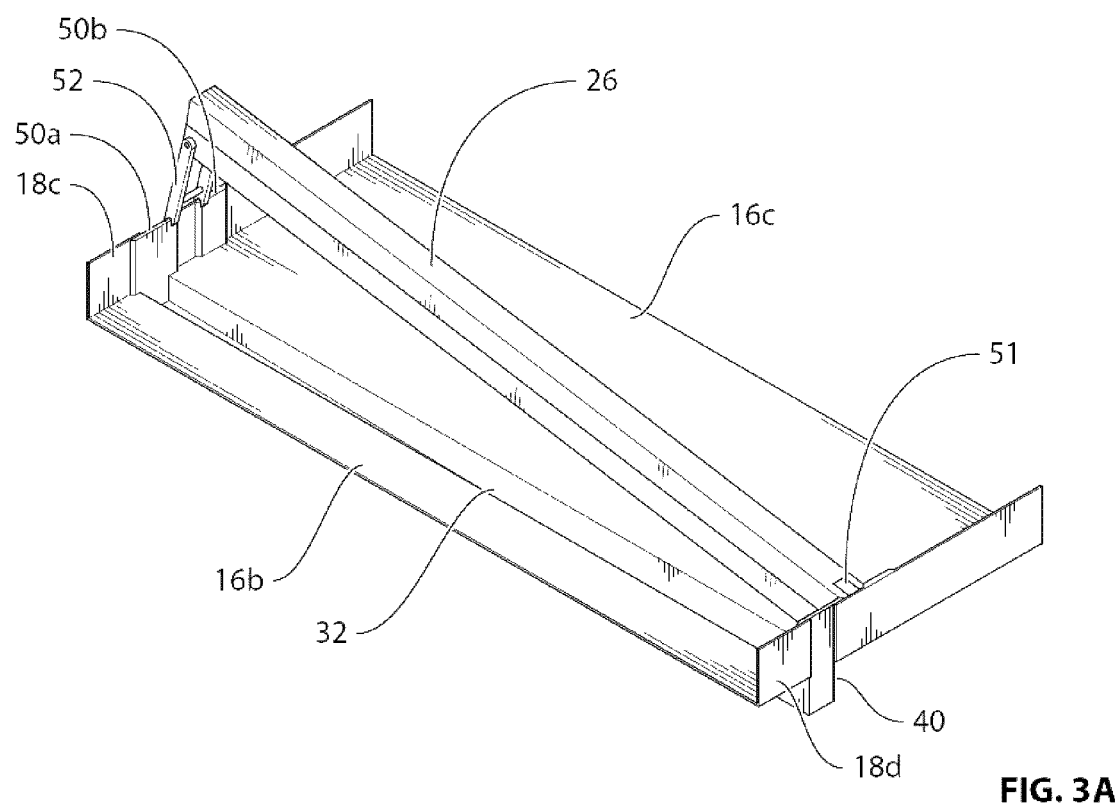
FIG. 3A is a perspective view of a pair of end caps in another embodiment with the moveable section divider in the open position.

Referring to FIGS. 2A, 2B, 3A, and 3B, a pair of connecting end caps 16b, 16c situated between adjacent sections of a raceway are shown in detail. The pair of end caps 16b, 16c are operably connected together to support a moveable section divider 26 separating the adjacent sections. The moveable section divider 26 is moveable between the closed position (FIGS. 2A and 3B) and the open position (FIGS. 2B and 3A).

The pair of end caps 16b, 16c correspond to an end cap 16b situated at the end of a first section and an end cap 16c positioned at the start of the adjacent downstream section. The length (L) of each end cap 16b, 16c is typically approximately equal to 30% to 70% of the width (W) of the section or raceway. In some embodiments, the length (L) of each end cap 16b, 16c may be approximately equal to 50% of the width of the section (N) or, with reference to FIG. 1, approximately equal to the distance from each side wall 20a or 20b to the centre wall 14. It is proposed that this size ratio helps to ensure an uninterrupted flow rate for the water circulation. In certain embodiments, it is contemplated that a pair of end caps 16b, 16c may be manufactured as a unitary structure.

The moveable section divider 26 that separates one section of a raceway from the next engages the floor of the end cap 16b where it joins end cap 16c. In certain embodiments, the engagement of the moveable section divider 26 with the floor of the end cap is watertight. The primary purpose of the moveable section divider 26, however, is to prevent passage of shrimp between sections. Thus, in certain embodiments it is contemplated that the engagement between the moveable section divider 26 and the floor of the end cap is sufficiently tight to prevent passage of shrimp between the two sections, but may still allow passage of some water and debris. In certain embodiments, the moveable section divider 26 is configured to allow passage of water between sections in order to assist in maintaining approximately equal water levels between sections. For example, the moveable section divider 26 may comprise one or a plurality of perforations, holes, slots or other openings sized to allow passage of water therethrough but to prevent passage of shrimp.

The moveable section divider 26 can be raised to allow passage of water and shrimp between the two sections, and lowered back into engagement with the end cap floor after transfer. The moveable section divider 26 may be configured to be raised and lowered manually or it may be configured to be power operated. Moveable section divider 26 is typically between about 15 cm and about 50 cm thick, for example, between about 15 cm and about 45 cm, between about 20 cm and about 45 cm, or between about 20 cm and about 40 cm. The height of moveable section divider 26 can be from about 20 cm to about 100 cm, from about 20 cm to about 90 cm, from about 25 cm to about 90 cm, from about 30 cm to about 80 cm, or from about 30 cm to about 70 cm. In certain embodiments, the moveable section divider 26 is substantially the same height as side walls 18a, 18b, 18c, 18d and/or 20a, 20b. Heights slightly higher or lower (for example, ±20%) than that of side walls 18a, 18b, 18c, 18d and/or 20a, 20b are also contemplated in some embodiments provided that the moveable section divider 26 remains above the level of the water in the raceway.

Referring to the embodiment illustrated in FIGS. 2A and 2B, the moveable section divider 26 is completely removable from the raceway. The end cap 16b may optionally include a slot configured to receive the lower part of the moveable section divider 26. Side walls 18c, 18d are also adapted to engage the ends of moveable section divider 26. In the embodiment shown in FIGS. 2A and 2B, the side wall 18c includes a pair of retaining members 44a, 44b that engage the end of moveable section divider 26. Retaining members 44a, 44b also help to retain the moveable section divider 26 in an upright position when closed. Side wall 18d similarly comprises a pair of retaining members to engage the opposite end of moveable section divider 26.

In the configuration shown in FIGS. 2A and 2B, moveable section divider 26 may optionally include one or more lifting means, such as handles, grips, knobs or protrusions, to assist in removal of the moveable section divider 26. In the embodiment shown in FIGS. 2A and 2B, the moveable section divider 26 comprises handles 42a, 42b at each end to help lift the moveable section divider 26 out of slot 48. The moveable section divider 26 may be completely removed to allow water and shrimp to pass between sections, or it may be lifted out of slot 48 but only partially removed from retaining members 44a, 44b. In the latter case, the end cap may further comprise a locking mechanism to lock the moveable section divider 26 in place once lifted.

Figure 3B:
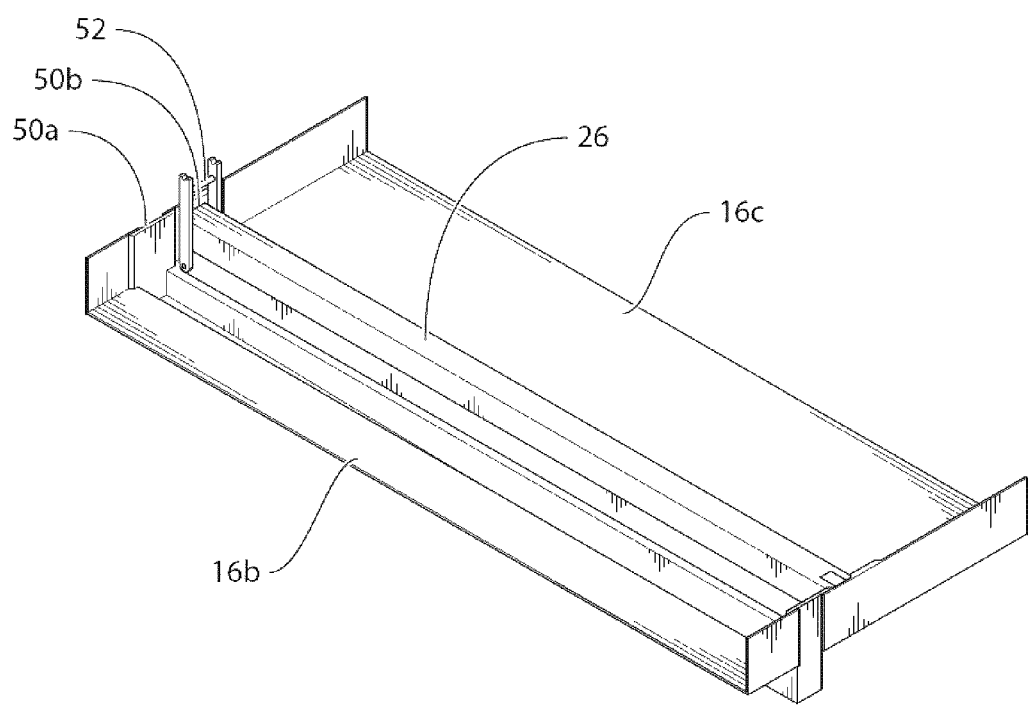
FIG. 3B is a perspective view of the pair of end caps shown in FIG. 3A, with the moveable section divider in the closed position.

An alternative embodiment in which moveable section divider 26 is a cantilever design is shown in FIGS. 3A and 3B. In this embodiment, the moveable section divider 26 is attached by a hinge mechanism 51 to one of the side walls 18d and engages with retaining members 50a, 50b on the opposing side wall 18c. In this embodiment, moveable section divider 26 includes a locking mechanism 52 rotatably attached to the moveable end of the wall for retaining the moveable section divider 26 in an open position (FIG. 3A) by engaging the top of side wall 18c. Locking mechanism 52 can be rotated to an unlocked position (FIG. 3B) allowing the moveable wall 26 to return to its closed position.

Figure 8A:
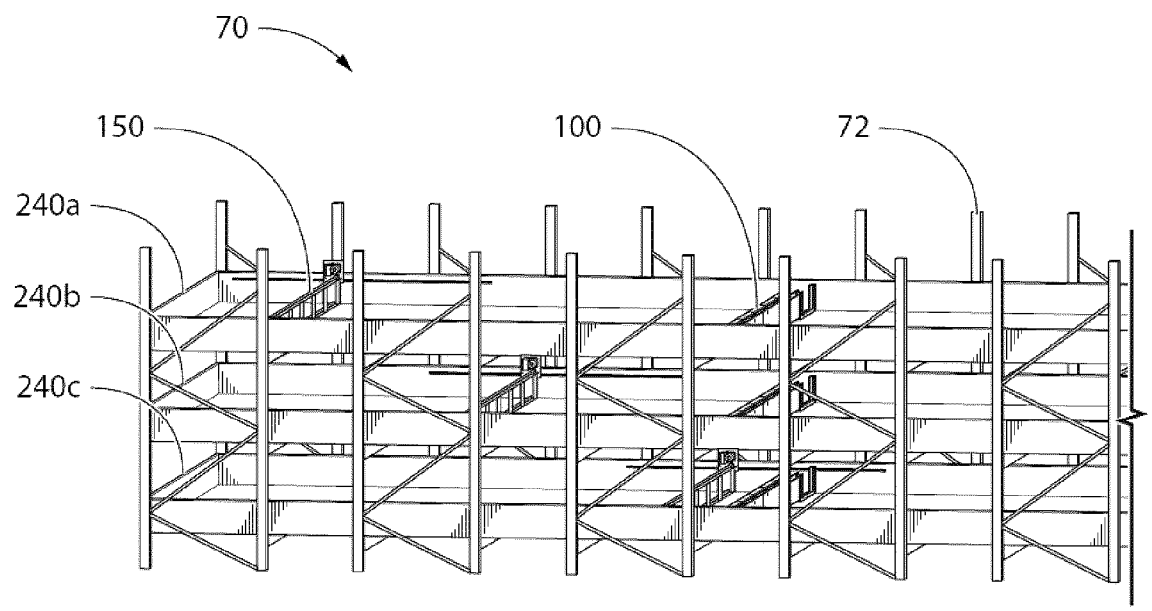
FIG. 8A is a side perspective view of a production module comprising a plurality of stacked raceways each adapted with a sweeper assembly and a weir assembly in the open position, according to one embodiment.
Figure 8B:
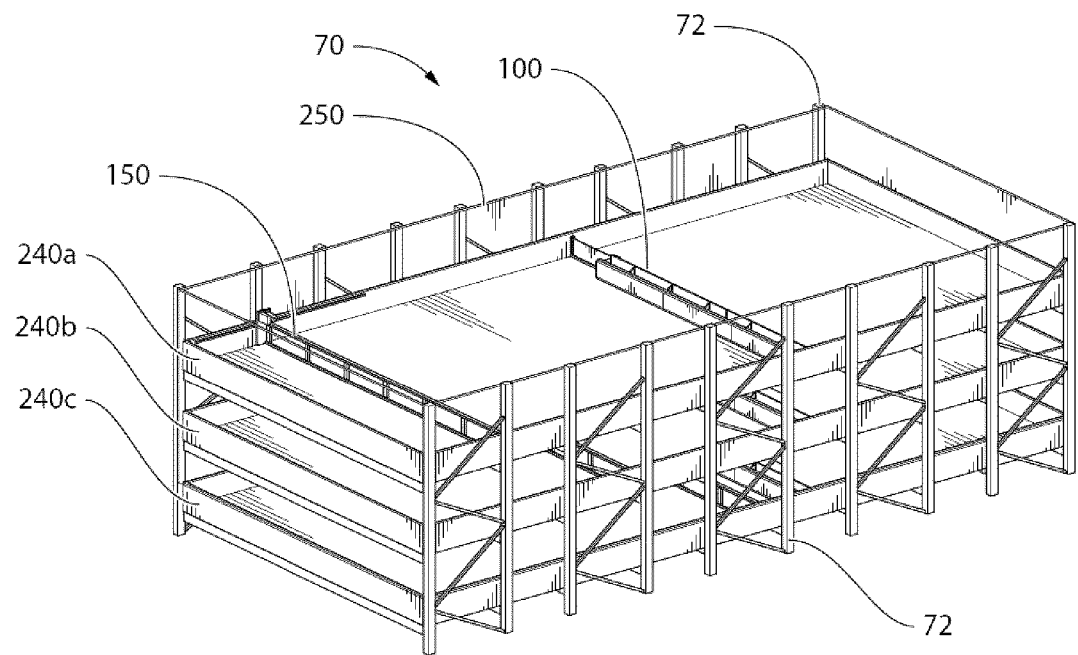
FIG. 8B is a side perspective view of the production module shown in FIG. 8A, with the weir assembly in the closed position.
Figure 8C:
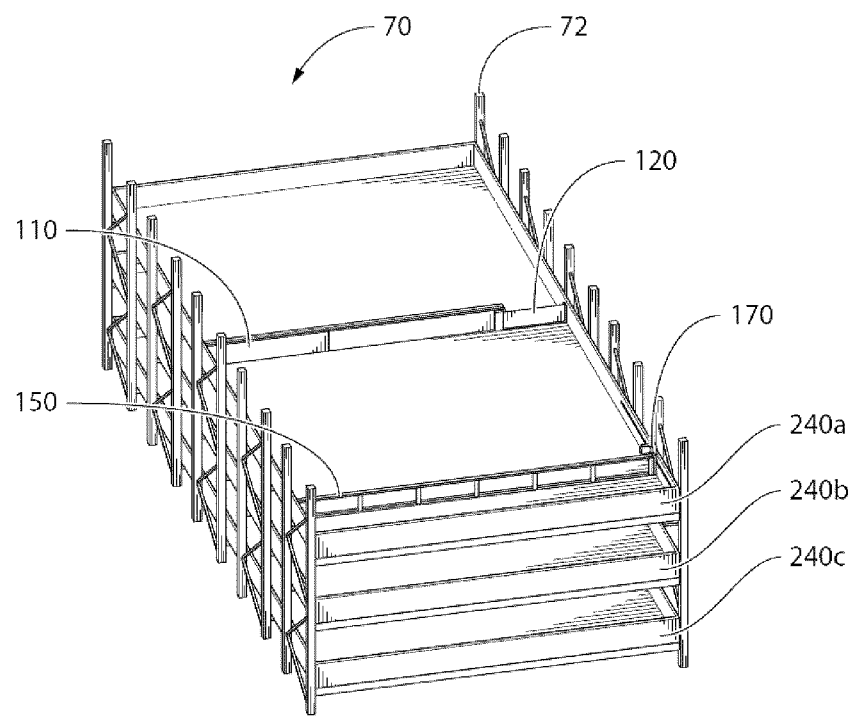
FIG. 8C is a top view of the production module shown in FIG. 8B.
Figure 8D:
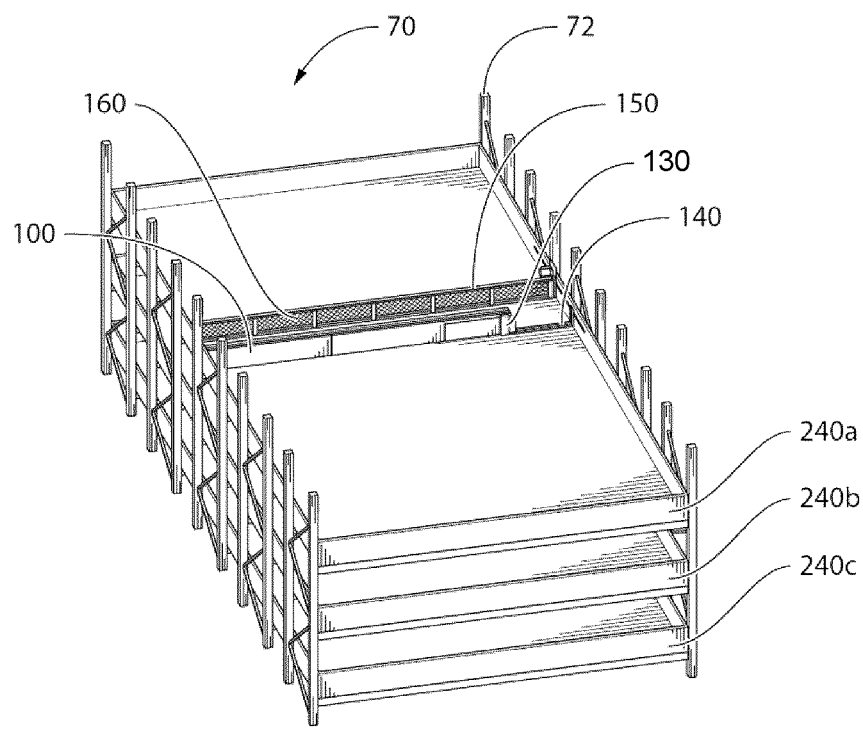
FIG. 8D is a top view of the production module shown in FIG. 8A.

Referring to FIGS. 8C and 8D, the moveable section divider according to certain embodiments comprises a weir assembly 100 having a fixed portion 110 and a moveable portion 120. The weir assembly 100 is positioned within the raceway to form a separating wall between two adjacent sections. The weir assembly 100 is therefore fixed to opposing side walls of the section. The moveable portion 120 of the weir assembly 100 is configured to be moved relative to the fixed portion 110 between the open and closed positions. As will be evident to those skilled in the art, the moveable portion 110 of the weir assembly can be configured in a variety of ways in order to allow positioning between the open and closed positions. According to certain embodiments, for example, the moveable portion 120 can be hingeably attached to the fixed portion 110 to allow the respective portions to move between open and closed positions. According to further embodiments, as shown in FIGS. 8C and 8D, for example, the moveable portion 120 can be configured to be slideably retractable from the fixed portion 110 of the assembly 100 in order to move the slideable portion 120 towards and away from the side wall of the section. When the slideable portion 120 is extended and engages the section side wall, a watertight seal is created to close off and contain the water and shrimp in the section (FIG. 8C). When retracted, the slideable portion 120 creates an opening in the weir assembly 100 through which shrimp are able to swim into the next grow stage in the adjacent section (FIG. 8D).

Persons of skill in the art will appreciate that the slideable portion 120 can be attached to the fixed portion 110 of the weir assembly 100 in a variety of ways in order to permit retractability. According to certain embodiments, for example, the slideable portion 120 is secured to the fixed portion 110 of the weir assembly 100 by a bracket 130 that permits the slideable portion 120 to slide therethrough. According to further embodiments, the fixed portion 120 can include guiderails 140 that guide the slideable portion 120 during movement and further ensure a watertight seal with the floor and side walls of the section.

The slideable portion 120 of the weir assembly is sized to create an opening large enough to efficiently allow a sufficient volume of shrimp to pass through. According to certain embodiments of the present disclosure, the slideable portion 120 forms up to 30% of the total length of the weir assembly 100. According to further embodiments, the slideable portion 120 forms about 25% of the total length of the weir assembly 100. According to other embodiments, the slideable portion 120 forms about 20% of the total length of the weir assembly 100. According to further embodiments, the slideable portion 120 forms about 10% to about 35% of the total length of the weir assembly 100.

Shrimp Crowding—Sweeping Assembly

To transfer the animals between sections, the moveable section divider 26 that separates each adjoining section is moved to the open position to allow the animals to swim into the adjacent downstream section as the water flows in the downstream direction. A "crowding" technique may further be adopted, according to certain embodiments, to facilitate this transfer between sections that involves slowly moving a sweeper in the downstream direction to gently force the shrimp to swim through the opening and into the next adjacent section.

According to certain embodiments, each section of a raceway can include a sweeper assembly to effect the crowding technique to facilitate transfer of shrimp between sections. As shown in FIG. 8D, when crowding of the shrimp is desired, the sweeper assembly 150 is configured with a screen wall 160 that extends across the width of the section. The screen wall 160 is configured for linear movement along the length of the section. As shown in FIG. 8C, when the moveable section divider 100 is in the closed position and crowding of the shrimp is not required, the sweeper assembly is positioned at the upstream end of the section and the screen wall 160 is removed in order to avoid hindering the shrimp from freely moving within the section.

To transfer the shrimp to the adjacent section, the moveable section divider 100 is opened, the screen wall 160 is attached to the sweeper assembly, and the sweeper assembly 150 is activated to move the screen wall 160 along the length of the section in the downstream direction (FIG. 8D). As the screen wall 160 is moved downstream, the shrimp in the section are crowded towards the opening in the moveable section divider 100 and gently forced to swim into the adjacent section.

Figure 10A:
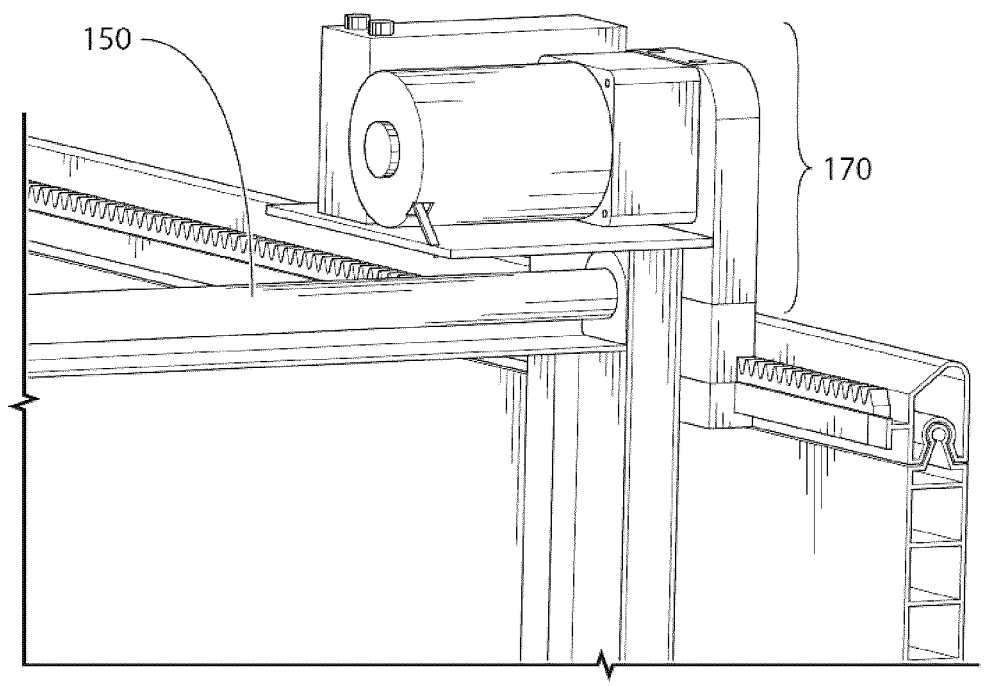
FIG. 10A is a perspective view of a motorized rack and pinion gear system of a sweeper assembly, according to one embodiment.
Figure 10B:
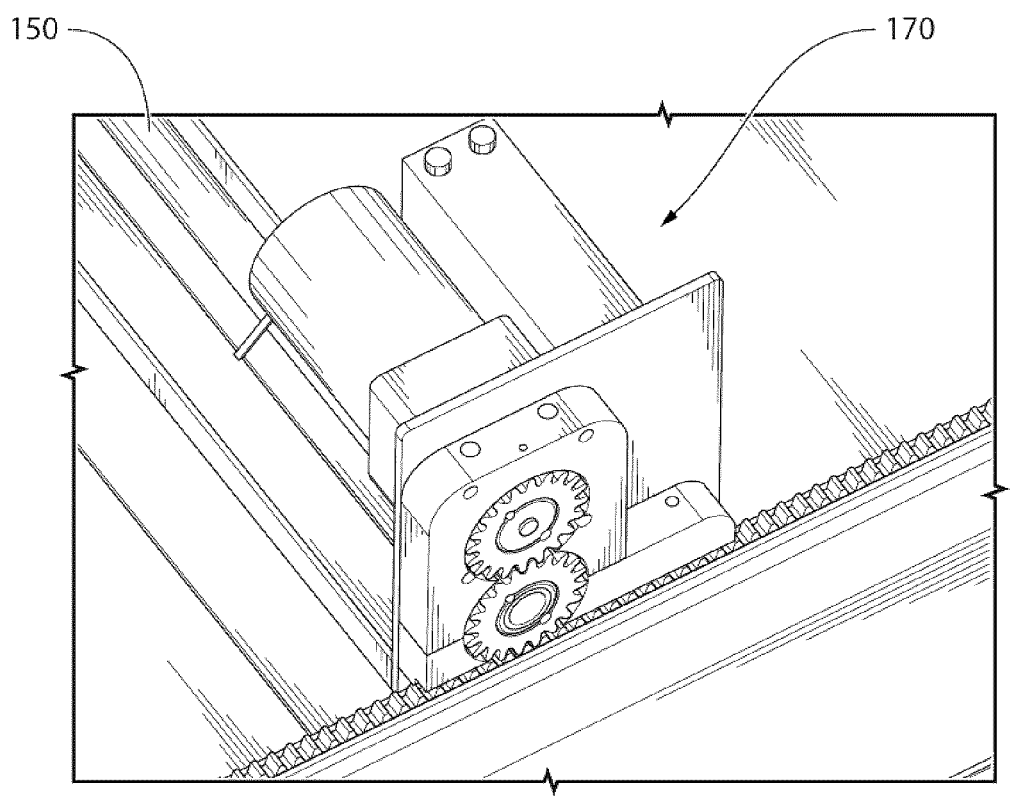
FIG. 10B is a top perspective view of the motorized system shown in FIG. 10A.

According to certain embodiments, the sweeper assembly 150 is motorized such that movement of the screen wall 160 is power operated. For example, as illustrated in FIGS. 10A and 10B, the sweeper assembly 150 can be operably connected to a motorized rack and pinion gear system 170 which automatically effects the linear movement of the sweeper assembly 150 along the length of the section.

In addition to effecting the crowding technique for transfer of shrimp between sections, the sweeping assembly 150 can also be used to facilitate waste collection in each section. As is known to those skilled in the art, each section typically will require waste material such as morts and molts to be removed at least once daily. In this regard, the sweeping assembly 150 can be used to sweep such waste material to the downstream end of each section where it can be collected and removed using various methods known to those skilled in the art. According to certain embodiments, the waste material swept to the downstream end of the section can be manually removed. According to other embodiments, the waste material swept to the downstream end of the section may be collected by a waste collection assembly, embodiments of which are described herein, and removed from the section. In such embodiments, the screen wall 160 is removed and the sweeping assembly 150 is moved along the length of the section in the downstream direction thereby sweeping waste along the way without crowding the shrimp.

According to certain embodiments, the screen wall 160 of the sweeping assembly 150 can be interchangeable such that screen walls 160 of various mesh sizes may be used. In this way, the sweeping assembly 150 can be customized with a suitable screen wall 160 mesh size to achieve the particular function, for example, waste collection, grading, or shrimp crowding. Mesh size for the screen wall 160 typically range between about 1/16" to about 3/8" depending on the function required.

Waste Collection—Waste Collection Assembly

As discussed, waste material must be removed from the raceway on a regular basis and typically at least once or twice daily. According to certain embodiments of the present disclosure, sections of the raceway can include a waste collection assembly situated at the downstream end of each section. The waste collection assembly according to such embodiments is configured for collecting waste in the section for removal by removal methods known in the art.

Referring to embodiments comprising end caps 16b, 16c, as shown in FIGS. 1, 2A, and 3A, the end caps 16b, 16c can be configured to allow for collection of waste and may optionally be further configured for harvesting of shrimp. In the embodiment shown in FIG. 1, the waste collection assembly comprises an appropriately positioned grid and an associated receptacle. As shown in FIG. 1, the floor 22a, 22b of each end cap 16a, 16b comprises a grid 24a, 24b that comprises a plurality of holes sized to allow solid waste to fall through but which are small enough to prevent the animals from swimming through, thus avoiding loss of shrimp during routine waste removal. The diameter of the holes may vary from section to section to take into consideration the change in the size of the animals in each section.

As shown in more detail in FIGS. 2A and 2B, the end cap comprises a waste collection assembly, which includes a grid 24b, 24c of specifically sized holes and a receptacle 40. While in the embodiment shown in FIGS. 2A and 2B, the end caps 16b, 16c each comprise a single grid 24b, 24c that occupies one side of the end cap floor area, it will be appreciated that the grid could also occupy the entire end cap floor area, could be located in a central portion of the end cap floor area, or the end cap could comprise two or more smaller grids. In some embodiments, the grid may extend the entire width (W) of the end cap. In some embodiments, the grid may extend the entire width (W) of the end cap but be narrower than the length (L) of the end cap.

Similarly, while the two grids 24b, 24c are shown in FIGS. 2A and 2B as being positioned on opposed sides of their respective end caps 16b, 16c, when a single grid is present in each end cap, the two grids may also in some embodiments be positioned on the same side of their respective end caps. The grid or grids comprised by the end cap may be integrated into the floor of the end cap such that they are essentially fixed, or they may be removable to allow for removal and cleaning.

Receptacle 40 is positioned below the grid or grids in the end cap to allow for collection and removal of waste that falls through the holes in the grid. The dimensions of receptacle 40 will be determined by the size and position of the associated grid or grids, and by the intended spacing between stacked raceways. By way of example, in the embodiment shown in FIGS. 2A and 2B, in which the grid 24b occupies approximately half the floor area of the end cap 16b, the receptacle is sized to have a width and length that substantially correspond to half the floor area of the end cap 16b. In this embodiment, the receptacle 40 comprises a bottom wall 32 that slopes from approximately the centre of the end cap 16b to form a substantially flat section 34 as it approaches the outer edge of the end cap 16b. At the end of the flat section 34 is an end wall 36, which is substantially aligned with the side wall 18d of the end cap 16b and is at approximately 90° to the flat section 34. When the end cap comprises a grid or grids that extend across the entire width (W) of the end cap, the receptacle likewise will extend the entire width of the end cap.

The drop in the bottom wall 32 from its point of contact with the end cap to the flat section 34 may be between about 10 cm and about 25 cm depending on the width of the section, as well as the space between the stacked raceways. The receptacle 40 further comprises two side walls resulting in an enclosed container.

While in the embodiment shown in FIGS. 2A and 2B, the bottom wall 34 is sloped, alternative embodiments include receptacles with a substantially flat bottom wall which also comprise a second end wall positioned in opposition to end wall 34. Other configurations including for example a second opposing end wall that is shorter than end wall 34 and a bottom wall with a lesser incline are also contemplated.

Receptacle 40 further comprises an outlet 38 for removal of waste, which would include feces and uneaten feed. In the embodiment shown in FIGS. 2A and 2B, the outlet 38 is positioned in end wall 34, however, the outlet may be placed in a number of locations in the receptacle provided that it is accessible to personnel who are removing the waste from the receptacle 40. For example, the outlet may be placed in a side wall of the receptacle 40, in the flat section 34 of the receptacle 40, or when the receptacle includes a substantially flat bottom wall, at any accessible location in the bottom wall.

In the embodiment shown in FIGS. 2A and 2B, the outlet is an essentially circular opening in the end wall 36, however, outlets with other configurations are also contemplated, including oval, square or rectangular openings, as well as spouts of varying configurations. Typically, the outlet will have a width of between about 5.0 cm and about 15.0 cm at its widest point, for example, between about 6.0 cm and about 14.0 cm, between about 6.5 cm and about 13.5 cm, or between about 7.5 cm and about 13.0 cm. In the embodiment shown in FIGS. 2A and 2B, therefore, the outlet may be between about 5.0 cm and about 15.0 cm in diameter, for example, between about 6.0 cm and about 14.0 cm, between about 6.5 cm and about 13.5 cm, or between about 7.5 cm and about 13.0 cm in diameter.

During normal operation, the outlet 38 is closed to prevent water egress. In certain embodiments, the outlet 38 may be in fluid communication with a hose or pipe that may be used to seal the outlet. The hose or pipe may be held in place for example by bolts or rivets and may comprise a valve at an appropriate distance from the receptacle, which can be closed when not in use and opened when access is required. The pipe or hose may further comprise a connector on the opposite side of the valve configured for attachment to a removal means, such as a vacuum or another hose.

Waste may be removed as necessary from the receptacle through the outlet by various means, for example, by suction, vacuum, manual retrieval, and the like. Typically, waste will be removed on a regular, for example daily or twice daily, basis.

The two end caps 16b, 16c may also comprise a harvesting assembly allowing for partial harvesting of the shrimp from a section. In the embodiment shown in FIG. 2A, the harvesting assembly comprises an opening 38a in the side wall 18d of the end cap 16b. The opening 38a should be sized to allow passage of the shrimp in that section of the raceway to pass through easily. As different sections of the raceway will contain shrimp of different sizes, the opening of the harvesting assembly in each section may differ in size accordingly. During normal operation, the opening 38a is closed to prevent water egress. In certain embodiments, the harvesting assembly may further comprise a hose or pipe in fluid communication with the opening 38a that may be used to seal the opening. The hose or pipe may be held in place for example by bolts or rivets and may comprise a valve at an appropriate distance from the receptacle, which can be closed when not in use and opened when access is required. The pipe or hose may further comprise a connector on the opposite side of the valve configured for attachment to a removal means, such as a vacuum or another hose.

Partial harvests of shrimp (or final harvests from the section of the raceway at the harvesting end) may be made through the opening 38a when desired by various means, including for example suction or vacuum.

In the embodiment shown in FIGS. 2A and 2B, the opening 38a is positioned in side wall 18d, on the same side of the end cap as opening 38 of the waste collection assembly. However, it will be readily apparent that the opening for the harvesting assembly may be placed in other locations in the end cap provided that it is accessible to personnel who are making the harvest, for example, in the opposite side wall of the end cap.

FIGS. 3A and 3B show an alternative embodiment of a waste collection/harvest assembly that may be included in the end caps. In this embodiment, the receptacle 40 is configured as a narrow channel in the floor of the end cap 16b and has a sloped or stepped bottom floor 32. The receptacle is covered by a grid or mesh (not shown) that comprises a plurality of holes sized to allow waste, but not shrimp, to pass through.

In the embodiments shown in FIG. 1 and FIGS. 2A and 2B, each end cap of a section comprises a waste collection assembly, and may optionally include a harvesting assembly. It is also contemplated that in some embodiments only one end cap of a section may include a waste collection assembly and/or harvesting assembly. FIGS. 3A and 3B show one example of an end cap designed for this configuration with end cap 16b comprising a waste collection assembly, and end cap 16c not including a waste collection assembly. In such embodiments, the waste collection assembly is preferably incorporated into the end cap at the transfer end of the section.

Figure 9A:
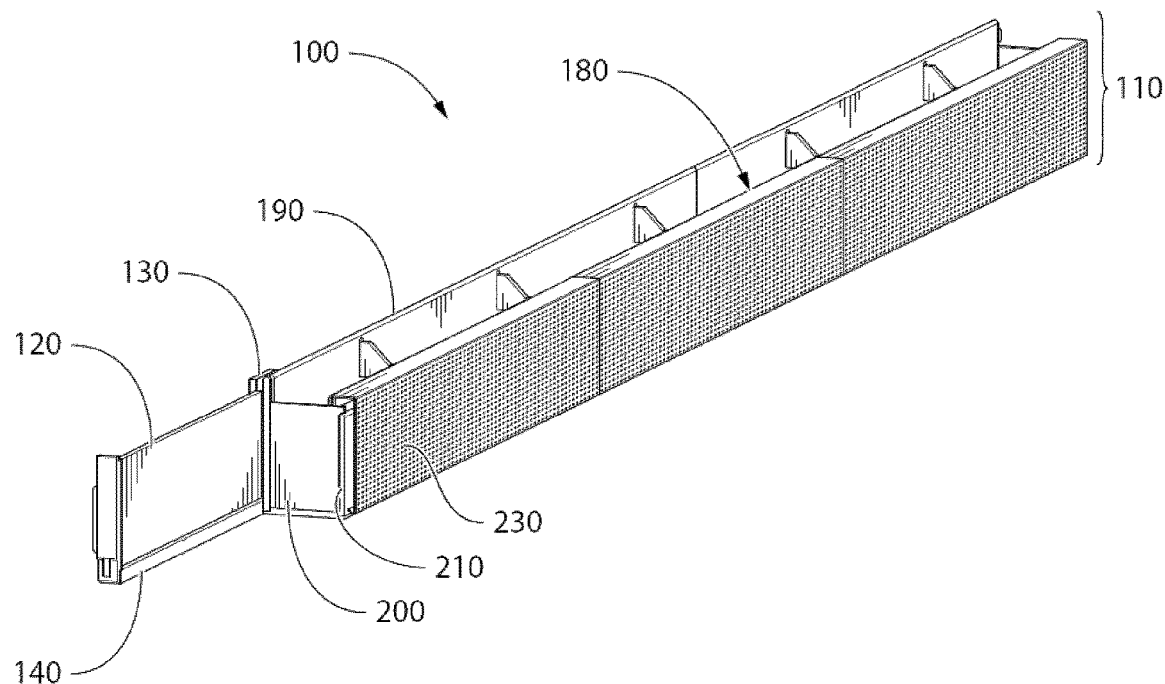
FIG. 9A is a perspective view of the weir assembly shown in FIGS. 8A to 8D.
Figure 9B:
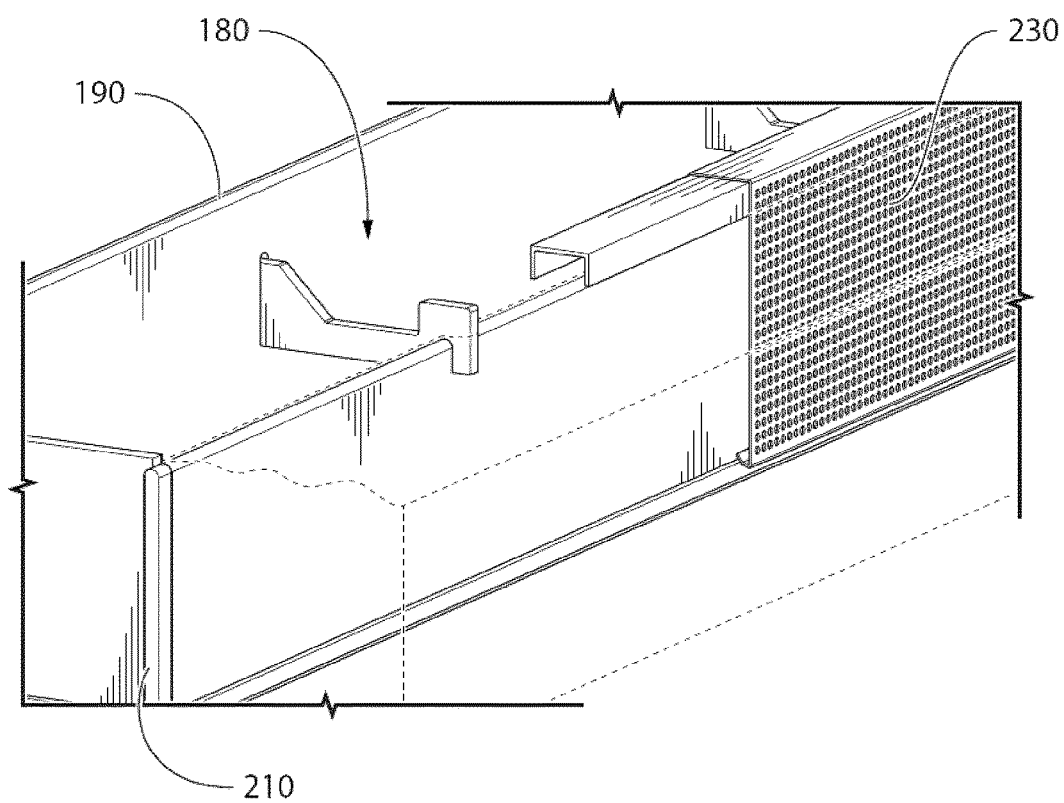
FIG. 9B is a side perspective view of the weir assembly shown in FIG. 9A.
Figure 9C:
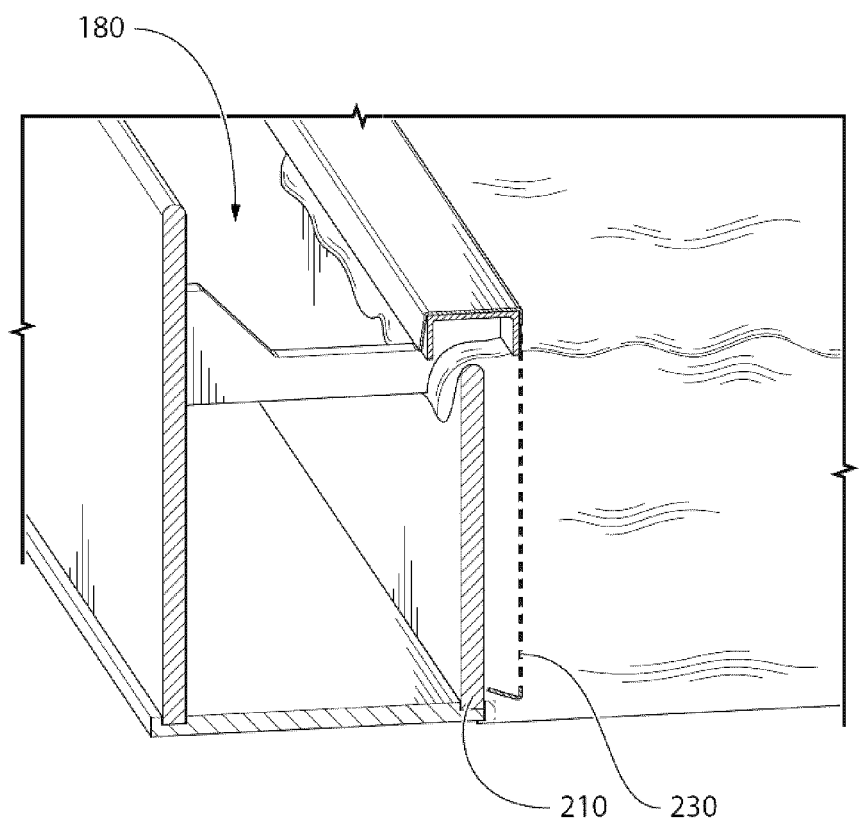
FIG. 9C is a side perspective view of the weir assembly shown in FIG. 9A, showing the interior of the reservoir and illustrating the water outflow into the reservoir.
Figure 9D:
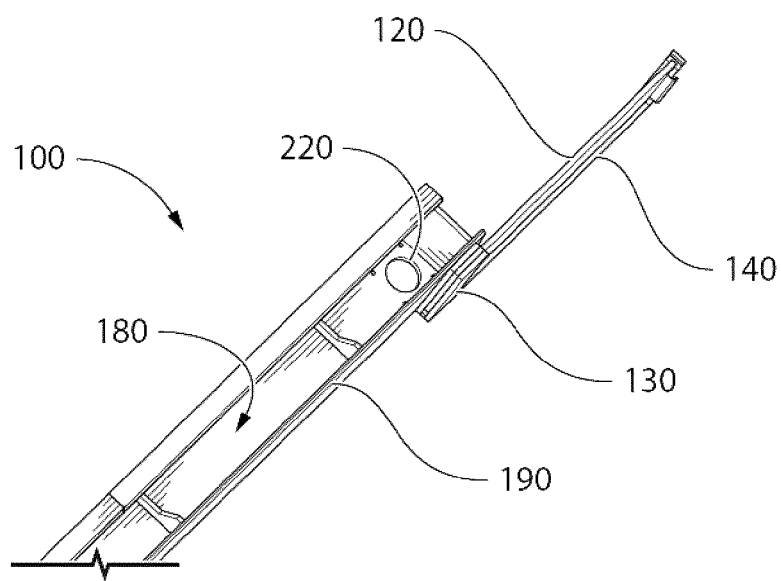
FIG. 9D is a top view of the weir assembly shown in FIG. 9A, showing the drain outlet in the reservoir.

As discussed, raceways of the present disclosure alternatively may not include end caps. Such embodiments, however, may still comprise a waste collection assembly. Referring to the embodiment illustrated in FIGS. 8C and 8D, for example, which comprise a weir assembly 100, the waste collection assembly comprises a reservoir 180 extending from the fixed portion 110 of the weir assembly 100. As shown in more detail in FIGS. 9A, 9B, and 9C, the reservoir 180 comprises a back wall 190 that is substantially the same height as the side walls of the section and higher than the level of the water in the raceway. The side walls 200 of the reservoir 180 and the section-facing wall 210 of the reservoir 180, are lower than the back wall 190 and low enough to allow water overflow, which may contain particulate debris, to flow over the top of the section-facing wall 210 into the reservoir 180 (FIG. 9C). The reservoir 180 further includes a water outlet 220 through which the water overflow drains (FIG. 9D). According to certain embodiments, the water outlet 220 can be fluidly connected to water treatment systems (e.g., RAS) which may in certain embodiments include a bio-filtration system, UV system, ozone system, pH calibration, as well as oxygen enrichment. In this way, the water overflow can be collected, treated, and recirculated to further conserve and reuse water, and minimize spillage and water losses. According to certain embodiments, the section-facing wall 210 may further comprise a screen 230 to further filter out large-sized waste from the water overflow and prevent possible clogging of the system.

In certain embodiments, the water outlet 220 can be operably connected to a sensor for detecting levels of water overflow whereby levels of water overflow can be determined and replaced with treated, recirculated water. In this way, water levels in the raceway can be monitored and maintained.

According to certain embodiments, the section may be configured with a harvesting assembly. For example, as shown in FIG. 4, and as already discussed, the end cap of section (C) at the harvesting end 66 of the raceway optionally allows for harvesting of the shrimp through a harvesting assembly. Additionally, or in the alternative, harvesting may also be conducted using a conveyor system or by manual netting. Partial harvest from preceding sections may also be conducted by manual netting, or when harvesting assemblies are present, by means of the harvesting assembly.

Water Circulation—Centre Wall

According to certain embodiments, the system of the present disclosure can be fluidly connected to a water treatment system (e.g., a recirculating aquaculture system (RAS)) which may in certain embodiments include a bio-filtration system, UV system, ozone system, pH calibration, as well as oxygen enrichment. In this way, water can be collected, treated, and recirculated throughout the system.

According to other embodiments, as shown in FIGS. 1 and 4, the system can be adapted to achieve water recirculation without an RAS. In such embodiments, for example, a raceway 58 may include a centre dividing wall (14a, 14b, 14c) that runs the length of the main body 15 between the upstream end cap 16a and the downstream end cap 16b. The centre wall 14 separates the mass of water within the section 10 allowing for a controlled and directional water flow. The thickness of the centre wall 14 is typically between about 0.50 cm and about 15.00 cm, for example, between about 0.60 cm and about 12.00 cm, between about 0.70 cm and about 10.00 cm, between about 0.70 cm and about 8.00 cm, between about 0.70 cm and about 6.00 cm or between about 0.70 cm and about 5.00 cm. In some embodiments, the width of the centre wall 14 is between about 0.80 cm and about 3.00 cm or between about 0.95 cm and about 2.54 cm. The height of the centre wall 14 is typically the same as the height of the side walls, although it may be slightly shorter or slightly higher (for example, ±20%) in certain embodiments provided that it remains higher than the water level in the Section 10.

In such embodiments, each section of a raceway is configured to allow the shrimp to swim and the water to circulate in one direction with the centre wall 14 ending at the start of each end cap 16a, 16b allowing either a clockwise or counter-clockwise flow.

The raceway, according to such embodiments, further comprises a plurality of pumps for water circulation and to oxygenate the water. In certain embodiments, the raceway may comprise a pump located at one end of each section. In some embodiments, a pump may be included at the base of each section in a stack of raceways, such that one pump may move water and provide oxygenation to all corresponding sections in the stack. In some embodiments, the raceway may comprise a pump at each end of each section. The size of each of the pumps will vary depending on the overall size of the raceway, as well as the size of each section. Thus, some embodiments contemplate the use the same size pumps throughout the raceway. In other embodiments, the size of the pumps may vary in accordance with the size of the section of the raceway they are servicing.

Raceways are generally made of fibreglass or plastic, such as polyethylene, however, the use of non-corrosive stainless steel, light concrete or other material that will not rust and is non-toxic to the shrimp is also contemplated in some embodiments.

In certain embodiments, the raceways may be manufactured in a series of parts that fit together in sealing engagement. For example, end caps and main body of each section may be manufactured as separate pieces. In some embodiments, the pair of end caps—one at the transfer end of a section and one at the entrance end of the succeeding section—may be manufactured in a unitary structure.

Production Module

A production module comprises two or more raceways that are stacked one above the other on a supporting structure. The maximum number of raceways that may be included in a production module is not limited to any particular number, but rather will be determined by various factors of the aquaculture facility, including the ceiling clearance height of the building in which the production modules are housed, the intended production levels of the facility, the strength of the supporting structure, costs, and the like. In general, it is contemplated that a production module will comprise between 2 and 12 stacked raceways. According to certain embodiments, a production module will have between 5 and 10 stacked raceways. According to another embodiment, a production module will have 7 stacked raceways.

Figure 5:
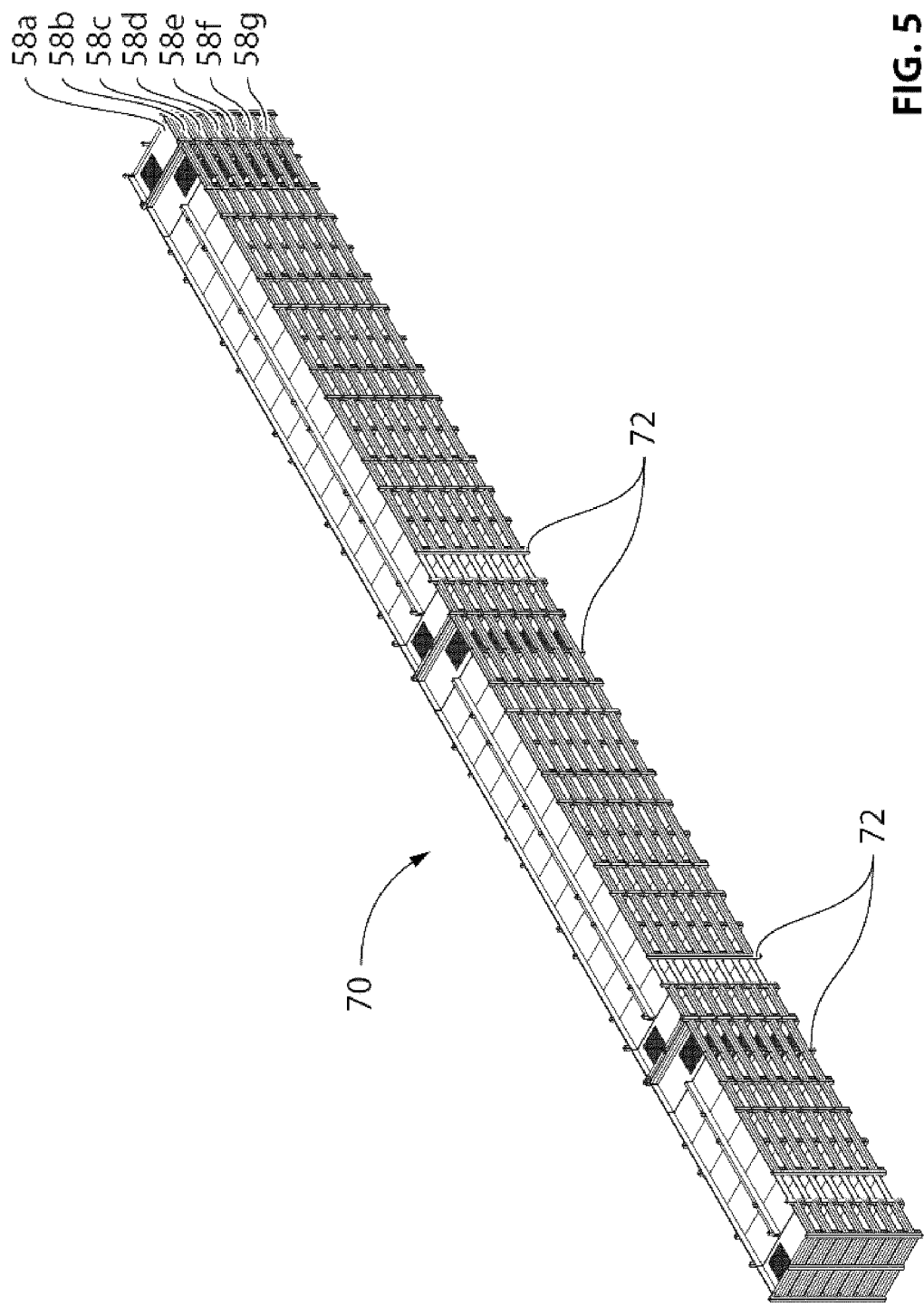
FIG. 5 is a perspective view of a production module in one embodiment.

FIGS. 5 and 8A depict embodiments of a production module 70 comprising raceways described herein. FIGS. 5 and 8A illustrate embodiments that comprise 7 raceways (58a-g) and 3 raceways (240a-c), respectively, arranged on supporting structure 72. The supporting structure may be a unitary structure or it may comprise several independent parts, having the same or different configurations, that may be used together to provide the supporting structure. Appropriate supporting structures can be readily designed by one skilled in the art provided with the considerations outlined herein.

The production module 70 should be configured to provide some clearance between the lowest point of the lowest raceway (58g) (240c) and the floor, for example, to allow for maintenance and/or cleaning. In certain embodiments, production modules may be configured to provide a clearance between the lowest point of the bottom raceway and the floor of at least about 10 cm, for example, at least about 15 cm, 20 cm, 25 cm, or 30 cm. In some embodiments, production modules may be configured to provide a clearance between the lowest raceway and the floor of between about 10 cm and about 75 cm, between about 15 cm and about 75 cm, between about 20 cm and about 75 cm, between about 20 cm and about 50 cm, or between about 30 cm and about 50 cm, or any range therebetween. According to certain embodiments the production modules have a 30 cm clearance between the lowest raceway and the floor.

The raceways 58a-g, 240a-c within production module 70 should be stacked at intervals that provide sufficient space to allow access for maintenance of the raceways. In certain embodiments, the height between the top of one raceway and the bottom of the raceway stacked above may be at least about 60 cm, for example, at least about 65 cm, at least about 70 cm or at least about 75 cm. Typically, the raceways within a production module will be stacked with regular spacing between them, although production modules having raceways stacked with varying spacing are also contemplated in some embodiments. For example, the lower and/or upper raceways in a production module may be more difficult to access and thus require slightly increased spacing between raceways.

The supporting structure 72 may be made of any material that has sufficient strength to handle the load of the stacked raceways, preferably a material that is not, or is only minimally, prone to rusting when exposed to water, salt, humidity and/or condensation. Non-limiting examples include materials comprising fibreglass, certain plastics, stainless steel, and powder coated galvanized steel.

Figure 11:
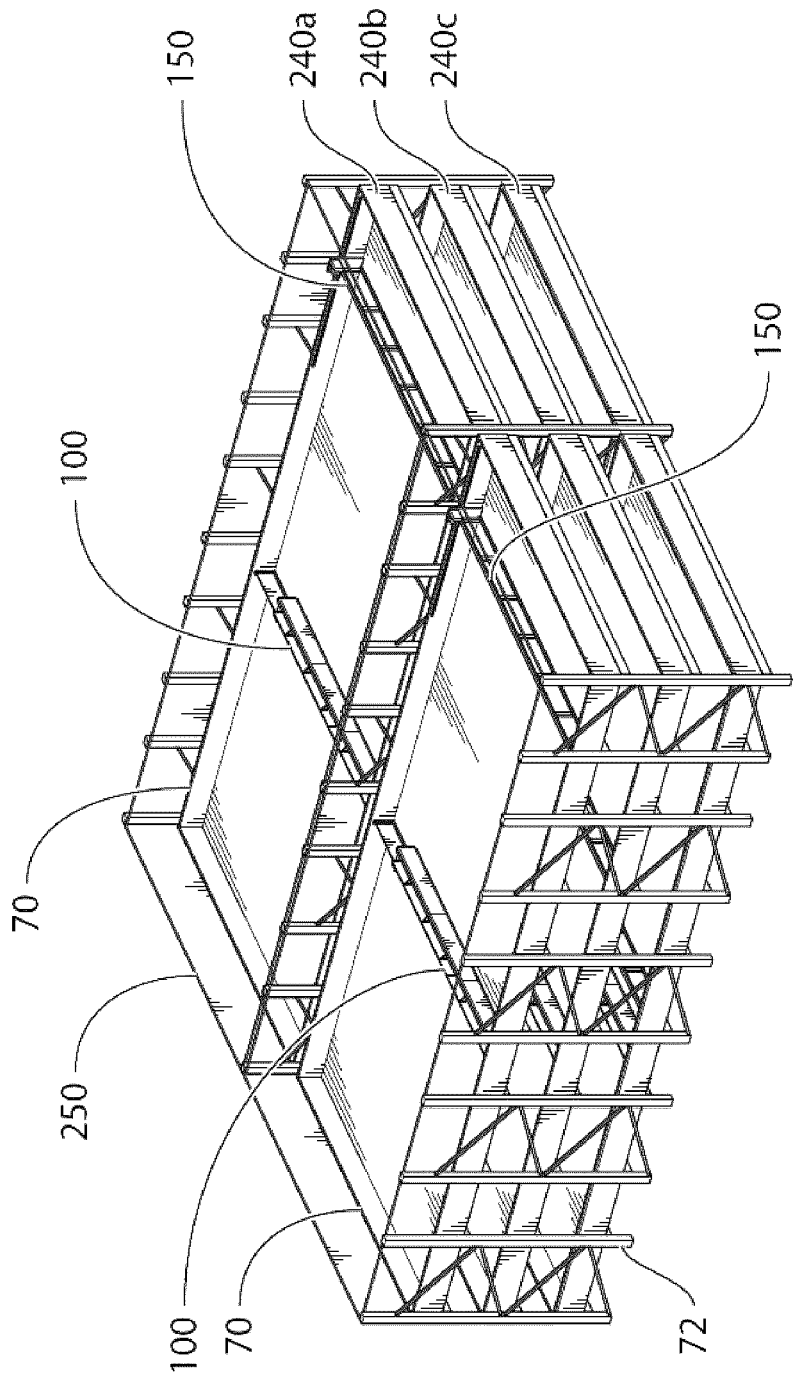
FIG. 11 is a perspective view of a system comprising a plurality of production modules in one embodiment in which the production modules comprise removeable coverings.

In order to maintain the heated environment of the raceway, the production module according to certain embodiments may include removeable coverings 250 to enclose each level of stacked raceways in order to retain temperature and humidity within (FIGS. 8B and 11). In this way energy efficiencies of the system can be maximized by conserving relative humidity of the raceway, and in turn reduce evaporative water and heat loss. By enclosing the raceway, the raceway air space can also be separated from the environmental air space (building/people air space) thereby maintaining the air quality of both the surrounding environment and the raceway, respectively. According to such embodiments, the removeable coverings 250 may be manufactured from plexi-glass or clear heavy vinyl, for example.

System

Figure 6:
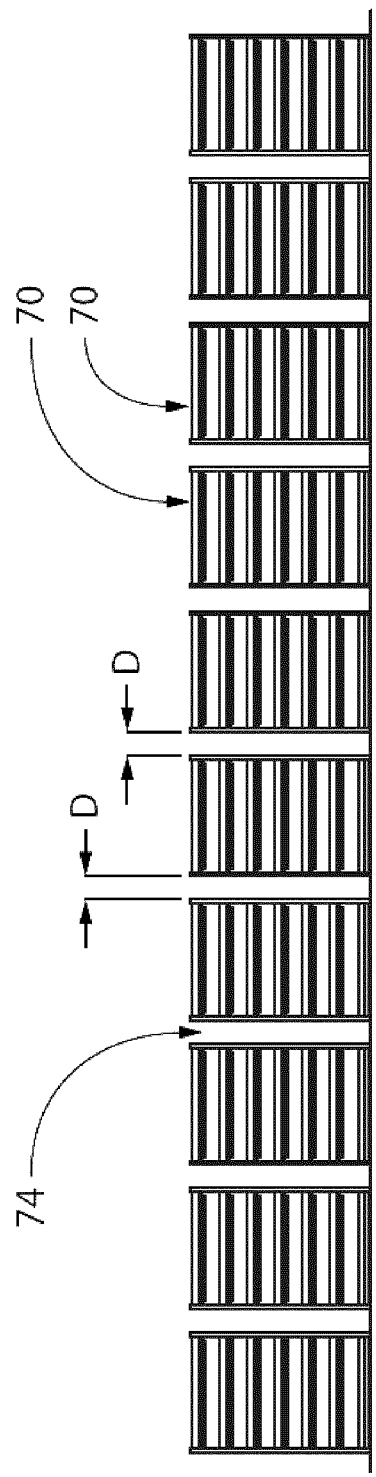
FIG. 6 is an end view of a system comprising a plurality of production modules in one embodiment in which the production modules are arranged in rows.
Figure 7:
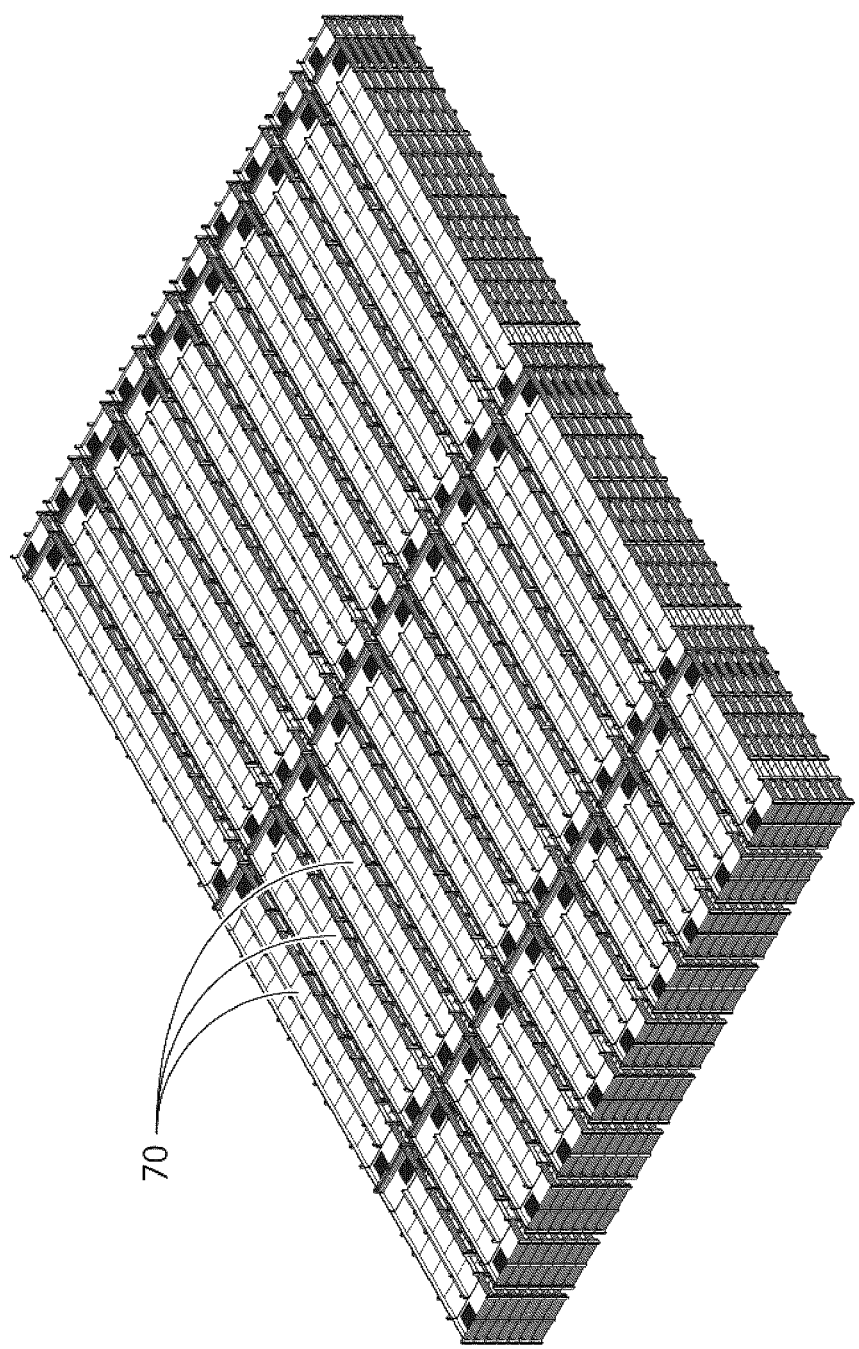
FIG. 7 is a perspective view of a system comprising a plurality of production modules in one embodiment in which the production modules are arranged in rows.

Certain embodiments relate to an indoor aquaculture system for shrimp that comprises a plurality of production modules. The production modules 70 may be housed within an appropriate building and will typically be arranged in parallel as shown in FIGS. 6 and 7. In the configuration shown in FIG. 7, each row comprises a single production module 70. Configurations in which rows comprise 2 or more production modules in series are also contemplated in some embodiments. The number of rows and the number of production modules in each row will be determined by the overall floor space of the building in which the production modules 70 are housed.

Typically, production module rows will be configured to provide an aisle 74 between each row having a width (D) sufficient to allow access to the raceways for operation and maintenance procedures, and in accordance with fire regulations. In general, an aisle width (D) of between about 0.75 meters and about 2 meters should be sufficient. When rows comprise more than one production module, an aisle may be provided between one production module and the next within the row, or the production modules may be arranged contiguously. When present, aisles between production modules within a row could be similarly sized to those between rows.

The above configuration is provided as an example only. A variety of solutions could be readily designed by the skilled person to safely enable farm staff to reach all raceways to conduct required operation and maintenance procedures regardless of the height of the production modules and the spacing between them.

For optimum shrimp growth, water in the raceways is maintained between about 30° C. and about 31° C. Lower or higher temperatures, for example down to about 25° C. or up to about 32° C. may be employed in alternative embodiments if lower growth rates and/or yields can be tolerated. Typically, incoming water is heated to the appropriate temperature and the ambient temperature in the building housing the raceways will be kept slightly above the desired water temperature, for example 1-2 degrees higher, in order to maintain the water temperature within the required range. Submersible heaters may be used to augment the heating strategy should this be necessary. To facilitate maintenance of an appropriate temperature, the production modules in some embodiments may be housed in an appropriately insulated and/or temperature controlled building or an appropriately insulated and/or temperature controlled separate area within a building.

The system may be operated such that each raceway of a production module is on the same shrimp growth schedule or such that raceways are on different growth schedules to allow for one or more crops to be harvested daily. Alternatively, some crops may be allowed to remain in the raceways for a shorter or longer period to allow for production of smaller or larger animals as dictated by market conditions or preferences. Partial harvests are also contemplated in some embodiments, as in certain embodiments each raceway section includes a harvesting assembly that can be used for partial harvests when required. The system thus provides flexibility in that each raceway can be operated independently from all others.

In certain embodiments, the system may further comprise a separate nursery to cultivate the pre-larval shrimps to an appropriate juvenile size to be introduced into the raceways. In some embodiments, the nursery may be housed in an enclosed area that is separate from the area housing the production modules. In some embodiments, the nursery may be housed in a separate area or building having its own climate and air quality control systems.

The nursery will comprise one or a plurality of tanks designed to allow the growth of pre-larval shrimp. In certain embodiments, the tanks comprise two end walls, two side walls and a flat bottom including a harvest/waste removal drain, for example, located at the periphery of the tank or in a corner of the tank. A nursery tank can vary in length from about 3 meters to about 20 meters and in width from about 0.5 meters to about 3.5 meters. The side walls can be between about 20 cm and about 80 cm high with water depth approximately 5 cm to 70 cm, for example about 10 cm to about 50 cm, less than the side wall height.

When the nursery comprises a plurality of tanks, these may be arranged in stacks on appropriate supporting structures in a similar manner to the raceways in the production modules.

In certain embodiments, the water temperature in the nursery tanks is maintained at about the same temperature as the grow out sections, for example between about 30° C. and about 31° C. to optimize the growth of the pre-larval shrimp. Lower or higher temperatures, may be employed in alternative embodiments for example between about 25° C. and about 26° C. In further embodiments, lower or higher temperatures may be employed if lower growth rates and/or yields can be tolerated, for example, down to about 22° C. and up to about 29° C. Water temperature may be maintained by following a similar strategy to that outlined above for the raceways. In some embodiments, therefore, the nursery may be housed in an appropriately insulated and/or temperature controlled area or building that is separate from the area or building in which the production modules are housed.

Due to the ability to independently maintain water quality and growth conditions of each section, the production modules can be configured to include a nursery section, according to certain embodiments. In this way, the system can be adapted to allow for seamless sequential production of shrimp through the life cycle of the shrimp. According to such embodiments, the production module includes an initial nursery section that is adjacent to the grow stage sections of the same raceway. The production module, therefore, can be adapted to be a fully self-contained system for growing shrimp from the initial nauplii or larval stages through to post-larval stages and harvest. In such embodiments, post-larval shrimp in the nursery section can be acclimated prior to transfer to the succeeding grow out sections. For example, conditions in the nursery section will typically include the use of a Biofloc system for the duration of the growth stage. According to embodiments of the present disclosure, the nursery section can be gradually acclimated to a clear water system prior to transfer of the shrimp to the succeeding grow sections. By gradual recirculation of the water in the nursery section in advance of transfer, the nursery can be converted to a clear water system. In this way, the shrimp are acclimated and the risk of compromising water quality of the system during transfer is avoided.

In some embodiments, the system may further comprise one or more harvesting tanks for receiving and temporarily storing the animals harvested from the production modules. The harvesting tank(s) may be in the same area or building as the production modules or they may be located in a separate area or building, for example, in a separate shipping area.

The harvesting tank(s) can be of varying sizes and configurations. In general, a harvesting tank may be between about 0.5 m and about 3.0 m wide, varying length and between about 0.5 m and about 1 m high. Harvesting tanks may be filled with salt water for storage of live animals, or with fresh water for animals that are fresh dead or that will be converted to fresh dead.

Method

In typical operation, juvenile shrimp between about 3 weeks and about 8 weeks old are introduced into a given raceway at the entrance end of the smallest section. The animals are maintained on a regimented growth cycle remaining in each of the sections for an equal period of time. By way of example, when a raceway is divided into four sections, with each section representing a growing stage, the animals would be transferred from the first smaller section to the next larger section after a time period of about 1 week to about 3 weeks, and then subsequently into succeeding sections every approximately 1-3 weeks depending on the production schedule (i.e., each growing stage would be about 1 week to about 3 weeks in length).

The animals are transferred between sections by actuating the moveable section divider 26 separating adjoining sections, to the open position and allowing the animals to swim into the larger downstream section as the water moves in that direction. A "crowding" technique may be adopted to facilitate transfer that involves slowly moving a sweeping assembly towards the larger downstream section, which gently forces the shrimp to swim into the larger downstream section. Once the transfer of the shrimp into the larger downstream section is complete, the moveable section divider 26 is returned to the closed position.

An exemplary transfer process for a given raceway may be as follows:

(1) Shrimp are moved or harvested from the largest section of the raceway (harvesting end 66), for example, through a hose/pumping system or an automated conveyor system. Typically, the animals are moved/harvested together with a portion of the water from the raceway section. Harvested shrimp may be transferred into a separate harvesting tank or container.

(2) Once the largest section has been emptied of animals, shrimp are then transferred from the adjacent "upstream" section by opening the moveable section divider 26 between the two sections. A crowding technique may be used to facilitate this process. Once this transfer has been completed, the moveable section divider is returned to the closed position.

(3) The moveable section divider between the section emptied in step (2) and the next upstream section is then moved to the open position and animals are transferred between sections as for step (2).

(4) This inter-section transfer is repeated over the length of the raceway until the smallest section at the receiving end 64 of the raceway has been emptied.

(5) The smallest section is then re-stocked with post larvae or juvenile shrimp between about 3 weeks and about 8 weeks old.

By way of example, for a raceway comprising four sections, or growing stages, the largest or stage four section would first be harvested and emptied of animals. Once complete, transfer of shrimp into the stage four section from the stage three section would take place. Once the stage three section had been emptied, it would accept a transfer from the stage two section. Once the stage two section was emptied, it would receive a transfer from the stage one section. Once the stage one section was emptied of animals, it would be re-stocked. Re-stocking of the stage one section could be with post larvae or juvenile shrimp from an external source or, when the system also comprises a nursery, restocking would use shrimp from the nursery.

In those embodiments in which the system comprises a nursery, the nursery receives the post-larval shrimp between about 7 and 21 days old, for example, about 10 or 11 days old. The post-larval shrimp may remain in the nursery for about 3 to about 8 weeks with the variance dependent upon a number of factors in the production scheduling, including i) anticipated size of harvested animal; ii) number of crops planned for; and/or iii) maximization of growing capacity. Appropriate residence time in the nursery could readily be determined by the skilled person when taking these factors into account.

The post-larval shrimp remain in the nursery for between about 3 and 8 weeks. The post-larval and/or juvenile shrimp may be transferred one or more times between tanks in the nursery to accommodate growth.

As an example, 11 day old post-larval shrimp could be received into a first tank in the nursery. After about 3 weeks the shrimp may have grown to a size where they require more space in order to avoid crowding. At this point, this entire cohort of shrimp would be divided and transferred into 3 tanks. This transfer could be repeated after a further approximately 3 weeks when the cohort would be divided and transferred into larger grow out tanks to accommodate their anticipated future growth.

Once the shrimp are of a sufficient size to leave the nursery, they are transferred to the production modules by introducing the shrimp into the smallest section at the receiving end of a raceway. The cohort of shrimp may need to be divided and transferred into a number of different raceways (always into the smallest section at the receiving end of the raceway) depending on the length of time the shrimp have spent in the nursery and their transfer weight.

The system and method disclosed herein provide flexibility with respect to production strategy and output. In certain embodiments, the method further comprises partial harvesting through the harvesting assembly from one or more sections at any point during the growing process in order to increase biomass output. Partial harvesting would be appropriate under circumstances such as higher survival rates than anticipated requiring a thinning out of the cohort to allow for maximum growth, or a market demand for smaller sized animals that would likely be more affordably priced than the full grown animal. Partial harvests allow for an increase in the overall biomass of a particular growth cycle by increasing the number of crops. Partial harvest crops would, however, be smaller both in animal size and numbers and thus may have less value in the marketplace.

To gain a better understanding of the invention described herein, the following examples are set forth. It will be understood that these examples are intended to describe illustrative embodiments of the invention and are not intended to limit the scope of the invention in any way.

EXAMPLES

Example 1

Exemplary Production Conditions

The system and method disclosed herein have been designed for maximum flexibility and production, and can allow for the ability to customize crops to meet any market demand. There are a number of variables that contribute to a production strategy including:

Market demand for size and price

Weekly weight gain

Mortality (Survival) Rate

Stocking Density
Harvest density
Partial Harvests
Feed Conversion Ratio
Production costs Taking the variables listed above into consideration an overall growing strategy is determined or one or more raceways may be customized to accommodate differing growing strategies simultaneously providing maximum flexibility.

For example, anticipating a post-larval shrimp (PL) to be 1.5-2 g in size after 5 weeks; 7 g after 8 weeks and 15 g after 12 weeks, the growing strategy will determine the length of time the PLs remain in the nursery phase. Specifically, if the end goal is to harvest a 25 g-26 g animal with a production of 18 crops per annum, then the growing strategy could include retaining the PLs in the nursery phase for 3 weeks, and transferring them to a first phase grow-out section of a raceway(s) in the main growing area at 1 g in size. Utilizing a 3 week transfer schedule, the shrimp would remain in the raceway for an additional 14 weeks gaining an average of 1.78 g per week or 25 g resulting in a harvest of 26 g animals every 3 weeks or 18 times per year.

Alternatively, if an average weekly weight gain of 2.5 g could be achieved, then the growing strategy will include retaining the PLs in the nursery phase for 2.5 weeks (and thus transferring to the main growing area at 0.5 g size), and subsequently remain in each of 4 growing stages in a raceway for 2.5 weeks. This strategy would result in a similar 26 g animal at harvest but due to the 2.5-week transfer schedule, would produce 20.8 crops per annum, a significant or close to 15% increase in annual production.

Alternatively, if an average weekly weight gain of 3 g could be achieved, then the growing strategy will include retaining the PLs in the nursery phase for 2 weeks (and thus transferring to the main growing area at 0.5 g size), and subsequently remain in each of 4 growing stages in a raceway for 2 weeks. This strategy would result in a similar 25 g animal at harvest but due to the 2 week transfer schedule, would produce 26 crops per annum, a significant or close to 25% increase in annual production.

An exemplary embodiment of the disclosed system is a multi-staged growing system with two separate growing areas or one large area separated by a moveable section divider: the first area or separated area is a nursery where the post-larval shrimp are received and where they remain for up to 6 weeks, and a main growing area, into which the shrimp are transferred once their stay in the nursery is completed.

The main growing area comprises a plurality of production modules each having 2 or more levels of raceways stacked upon another in a specially engineered and designed structure. Each raceway is divided into 3 or more sections with the preferred number being 4 to maximize production.

Utilizing the exemplary system embodiment described above, the following is anticipated:
Harvested size: 18 g-35 g
Number of crops: Up to 52 per annum
Water depth: 20 cm-40 cm
Survival Rate: 65%-95%
Average Weekly Growth Rate: 1.5 g-3.5 g
Feed Conversion Ratio: 0.8-1.75

Example 2

Expected Energy Conservation Efficiencies

The system and method disclosed herein have been designed for scaleable shrimp production. In particular, the system is configured for maximal energy and water conservation in large scale production. The expected energy and water use efficiencies provided by the system of the present disclosure was assessed by simulating various parameters that are anticipated to be achievable by the system of the present disclosure.

Energy and water conservation efficiencies were simulated based on an exemplary model system consisting of eight tank stacks per production building, seven tank layers per tank stack, having 500 square meters of water surface area and 110 cubic meters of water volume per tank stack layer.

The expected evaporative water loss, evaporative heat loss, and other modes of heat loss were calculated as a function of the relative humidity (RH) maintained over the shrimp culture water based on the specifications of the exemplary model system. Specifically, evaporative water loss, evaporative heat loss, and other modes of heat loss from shrimp culture water, as a function of air temperature and RH, were calculated by known methods (Ernst, D. H., 2000. AquaFarm: simulation and decision support for aquaculture facility design and management planning. Ph.D. Dissertation, Oregon State University, Corvallis, Oreg. 383 pp.; Ernst, D. H., Bolte, J. P., Nath, S. S., 2000. AquaFarm: simulation and decision support for aquaculture facility design and management planning, Aquacultural Engineering Journal (23) 1-3, pp. 121-179).

Results:

| | Water and heat loss simulation | | | | | | |
|---|---|---|---|---|---|---|---|
| Simulation scenario | 1 | 2 | 3 | 4 | 5 | 6 | 7 |
| Water temperature (C) | 30.00 | 30.00 | 30.00 | 30.00 | 30.00 | 30.00 | 30.00 |
| Air temperature (C) | 27.00 | 27.00 | 27.00 | 27.00 | 27.00 | 27.00 | 27.00 |
| Air relative humidity (%) | 75.00 | 80.00 | 83.00 | 85.00 | 90.00 | 95.00 | 99.00 |
| Wind speed (m/s) | 0.10 | 0.10 | 0.10 | 0.10 | 0.10 | 0.10 | 0.20 |
| Evaporation rate (mm/day) | 1.713 | 1.339 | 1.121 | 0.978 | 0.629 | 0.294 | 0.036 |
| Evaporation rate (%/day) | 0.78 | 0.61 | 0.51 | 0.44 | 0.29 | 0.13 | 0.02 |
| Water loss per bldg. (gal/day) | 11,524 | 9,008 | 7,541 | 6,579 | 4,231 | 1,978 | 242 |
| Heat loss for one tank row | | | | | | | |
| Evaporative (kWhr/day) | 579 | 453 | 379 | 331 | 213 | 99 | 12 |
| Water-air (kWhr/day) | 103 | 101 | 100 | 99 | 97 | 95 | 93 |
| Water-wall-air (kWhr/day) | 75 | 75 | 75 | 75 | 75 | 75 | 75 |

-continued

| | Water and heat loss simulation | | | | | | |
|---|---|---|---|---|---|---|---|
| Simulation scenario | 1 | 2 | 3 | 4 | 5 | 6 | 7 |
| Heat loss for one tank stack | | | | | | | |
| Heat loss (kWhr/day) | 5,299 | 4,403 | 3,878 | 3,535 | 2,695 | 1,883 | 1,260 |
| Heat loss (kW) | 221 | 183 | 162 | 147 | 112 | 78 | 53 |
| Heat loss (BTU/hr) | 754,043 | 626,543 | 551,836 | 503,027 | 383,496 | 267,949 | 179,297 |
| Heat loss for one building | | | | | | | |
| Heat loss per bldg. (BTU/hr) | 6,032,345 | 5,012,344 | 4,414,688 | 4,024,219 | 3,067,969 | 2,143,594 | 1,434,375 |

The simulated results show the large impact of relative humidity (RH) on evaporative water and heat loss. By containing and controlling humidity over shrimp tank water surfaces, for example with the inclusion of removeable coverings to enclose the raceways, the following objectives are expected to be achieved: (1) maximize RH while providing some minimal air exchange and (2) therefore minimize water and heat loss. Given that the actual RH levels could not yet be determined for operating systems, an RH level of 83% was used as a worst case scenario for heating system design. At 83% RH, evaporation was predicted to be 1.12 mm/day, or about 5%/day for a 22 cm deep water column. It is anticipated that an RH of 90% will be achievable with the system of the present disclosure with corresponding reductions in water and heat loss.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

The embodiments of the invention in which an exclusive property or privilege is claimed are defined as follows:

1. A raceway for shrimp aquaculture comprising:
    a plurality of interconnected sections arranged in series from an upstream receiving end of the raceway to a downstream harvesting end of the raceway, said sections having substantially the same width, but each section having a greater length than the preceding section, wherein the plurality of sections each comprising at least first and second opposed sidewalls and a bottom floor extending therebetween;
    a weir assembly situated between each adjacent section of said raceway, said weir assembly extending between said first and second sidewalls and comprising a fixed portion and an adjacent moveable portion, said moveable portion being moveable between a closed position defining a watertight seal wherein water and shrimp are separately contained in each section separated by the weir assembly, and an open position wherein water and shrimp may pass between said sections from an upstream to downstream direction, wherein said fixed portion further comprising:
    a reservoir of said weir assembly and fluidly connected to said upstream section such that water overflow from said upstream section spills over the top of said reservoir for collection therein; and
    wherein said fixed portion further comprises a screen on an upstream-facing side of said weir assembly wherein large-sized waste is filtered from said water overflow and prevented from entering the reservoir; and
    a fixed end wall at each of the receiving end and the harvesting end of the raceway.

2. The raceway according to claim 1, further comprising a sweeper assembly in each section of said raceway, said sweeper assembly extending across the width of the section and configured for linear movement along the length of said section.

3. The raceway according to claim 2, wherein said sweeper assembly is operably connected to a motorized rack and pinion gear system to automatically effect said linear movement of said sweeper assembly along the length of said section.

4. The raceway according to claim 3, wherein said sweeper assembly further comprises a removeable screen wall wherein said screen wall is interchangeable to allow screens of varying mesh size to be used for crowding shrimp for transfer to an adjacent downstream section.

5. The raceway according to claim 1, wherein the section further comprises a centre wall extending the length of the section, said centre wall being situated parallel to and equidistant from opposing side walls of said section.

6. A system for shrimp aquaculture comprising a plurality of raceways as defined in claim 1, a support structure and a water recirculation system for maintaining water quality, the plurality of raceways stacked one above the other on the support structure.

7. The system according to claim 6, wherein said system is a closed or zero water exchange system.

8. The system according to claim 6, further comprising removeable coverings to enclose each level of said stacked raceways in order to retain temperature and humidity therein.

9. The system according to claim 6, wherein said water recirculation system comprises an aquaculture recirculating system (RAS).

10. The systems according to claim 6, wherein said water recirculation system comprises a plurality of pumps, wherein each pump is operative to recirculate water in one section of a raceway, or wherein each pump is operative to recirculate water in a plurality of corresponding sections of the stacked raceways.

11. The raceway according to claim 1, wherein said reservoir comprises a water outlet through which the water overflow drains.

12. The raceway according to claim 1, wherein the raceway comprises between 3 and 6 sections.

13. The raceway according to claim 1, wherein the raceway comprises a first, second, third and fourth section, wherein as a percentage of the overall length of the raceway, the size of the first section is between about 1.0% and about 15%, the size of the second section is between about 8% and about 25%, the size of the third section is between about 15% and about 35%, and the size of the fourth section is between about 25% and about 45%.

14. The raceway according to claim 1, wherein the overall length of the raceway is between about 50 meters and about 150 meters, and the width of the raceway is between about 3 meters and about 5 meters.

15. A method of shrimp aquaculture comprising:
providing at least one raceway as defined in claim 1, wherein the raceway comprises at least first, second and third interconnected sections, the first section at the upstream receiving end of the raceway;
introducing larval, post-larval, or juvenile shrimp into the first section;
growing the shrimp to a first pre-determined size;
transferring the shrimp of the first pre-determined size to the second section of the raceway, the second section being adjacent to the first section, by moving the moveable portion separating the first and second sections from the closed position to the open position and allowing the shrimp to move into the second section;
growing the shrimp to a second pre-determined size;
transferring the shrimp of the second pre-determined size to the third section of the raceway, the third section being adjacent to the second section, by moving the moveable portion separating the second and third sections from the closed position to the open position and allowing the shrimp to move into the third section;
growing the shrimp to a third pre-determined size; and
harvesting the shrimp from the downstream harvesting end of the raceway.

16. The method according to claim 15, wherein the raceway further comprises a fourth interconnected section, and the method further comprises transferring the shrimp of the third pre-determined size to the fourth section of the raceway, the fourth section being adjacent to the third section, by moving the moveable portion separating the third and fourth sections from the closed position to the open position and allowing the shrimp to move into the fourth section and growing the shrimp to a fourth pre-determined size, before harvesting the shrimp from the harvesting end of the raceway.

17. The raceway according to claim 11, wherein said water outlet is operably connected to a sensor for detecting levels of water overflow, wherein detected levels of water overflow are replaced with recirculated water.

18. The method according to claim 15, wherein said first section is a nursery section for growing larval shrimp to a pre-determined size.

19. The method according to claim 15, wherein shrimp are partially harvested from any one or more of said sections.

* * * * *